United States Patent
Kitamura

(10) Patent No.: US 9,378,245 B2
(45) Date of Patent: Jun. 28, 2016

(54) NAME DATABASE SERVER, NAME RESOLUTION SYSTEM, ENTRY SEARCH METHOD AND ENTRY SEARCH PROGRAM

(75) Inventor: Hiroshi Kitamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 338 days.

(21) Appl. No.: 13/820,555

(22) PCT Filed: Oct. 11, 2011

(86) PCT No.: PCT/JP2011/005687
§ 371 (c)(1),
(2), (4) Date: Apr. 10, 2013

(87) PCT Pub. No.: WO2012/053162
PCT Pub. Date: Apr. 26, 2012

(65) Prior Publication Data
US 2013/0191412 A1  Jul. 25, 2013

(30) Foreign Application Priority Data
Oct. 18, 2010 (JP) .................. 2010-233412

(51) Int. Cl.
*G06F 17/30* (2006.01)
*H04L 29/12* (2006.01)

(52) U.S. Cl.
CPC ...... *G06F 17/30477* (2013.01); *H04L 61/1511* (2013.01); *H04L 61/251* (2013.01); *H04L 61/2525* (2013.01)

(58) Field of Classification Search
CPC .............................................. G06F 17/30864
See application file for complete search history.

(56) References Cited

U.S. PATENT DOCUMENTS

| 8,861,525 | B1 * | 10/2014 | Durand et al. ............... 370/392 |
| 8,886,750 | B1 * | 11/2014 | Mutz et al. .................... 709/217 |
| 2004/0143579 | A1 * | 7/2004 | Nakazawa ...................... 707/10 |
| 2010/0005146 | A1 * | 1/2010 | Drako et al. .................. 709/206 |
| 2010/0011420 | A1 | 1/2010 | Drako et al. |
| 2011/0271005 | A1 * | 11/2011 | Bharrat et al. ............... 709/232 |

FOREIGN PATENT DOCUMENTS

| CN | 1863196 A | 11/2006 |
| CN | 1933477 A | 3/2007 |

(Continued)

OTHER PUBLICATIONS

Keisuke Takeuchi et al., "Development of DNS Proxy Server cooperating with IPv4/IPv6 Translators", Technical Report of IEICE, NS2002-246, Feb. 2003, pp. 97-101.

(Continued)

*Primary Examiner* — Apu Mofiz
*Assistant Examiner* — Cindy Nguyen
(74) *Attorney, Agent, or Firm* — Sughrue Mion, PLLC

(57) ABSTRACT

A node information storage means stores an entry of node information in which at least an address and a record type are associated with a host name. A search target record deciding means decides a record type of an entry of a search target from a received virtual record type based on a search rule that is a rule specifying a record type of a search target according to a virtual record type. An entry searching means searches the node information storage means, and specifies an entry that corresponds to the entry specifying information received from the terminal device and has the record type decided by the search target record deciding means. A search result transmitting means transmits node information included in the entry specified by the entry searching means to the terminal device.

13 Claims, 18 Drawing Sheets

(56) References Cited

FOREIGN PATENT DOCUMENTS

| CN | 101390087 A | 3/2009 |
|---|---|---|
| JP | 5-12335 A | 1/1993 |
| JP | 3828894 B2 | 10/2006 |
| JP | 2009-182631 A | 8/2009 |
| JP | 2010-183242 A | 8/2010 |
| WO | 02/13057 A1 | 2/2002 |

OTHER PUBLICATIONS

M-K. Shin et al., "Application Aspects of IPv6 Transition", Mar. 2005, RFC4038 (http://www.ietf.org/rfc/rfc4038.txt).

R. Hinden et al., "IP Version 6 Addressing Architecture", Feb. 2006, RFC4291 (http://www.ietf.org/rfc/rfc4291.txt).

Hiroshi Kitamura et al., "Simplified DNS Query Methods under IPv4/IPv6 Mixed Environment", IEICE Technical Report, IN2010-153, Feb. 2011, pp. 55-61.

International Search Report for PCT/JP2011/005687 dated Nov. 29, 2011.

Communication dated Aug. 25, 2015 from the Japanese Patent Office in counterpart application No. 2012-539581.

Communication dated Dec. 19, 2014 from the Patent Office of the People's Republic of China in counterpart application No. 201180047164.4.

\* cited by examiner

NAME DATABASE SERVER, NAME RESOLUTION SYSTEM, ENTRY SEARCH METHOD AND ENTRY SEARCH PROGRAM

CROSS REFERENCE TO RELATED APPLICATIONS

This application is a National Stage of International Application No. PCT/JP2011/005687 filed Oct. 11, 2011, claiming priority based on Japanese Patent Application No. 2010-233412 filed Oct. 18, 2010, the contents of all of which are incorporated herein by reference in their entirety.

TECHNICAL FIELD

The present invention relates to a name database server, a name resolution system, an entry search method, a name resolution method, and an entry search program, which are used when name resolution is performed in a mixed communication environment of a plurality of record types.

BACKGROUND ART

Internet Protocol version 6 (IPv6)-based communication environment has newly been introduced into the Internet that has started from Internet Protocol version 4 (IPv4)-based communication environment. The current Internet is in the process of introducing IPv6 environment. For this reason, in the process of introduction, a plurality of types of communication devices such as communication devices that only support IPv4, communication devices in which a part of a function corresponding to IPv6 is implemented in addition to a function corresponding to current IPv4, and communication devices in which a function corresponding to IPv6 is completely implemented, and all functions corresponding to IPv4 and IPv6 are usable are present.

FIG. 15 is an explanatory diagram when name resolution is performed in an IPv4-based communication environment. FIG. 15 illustrates that two entries of IPv4 addresses p and q whose record type is "A" are registered to a domain name system (DNS) server with respect to a host name "hostX." When a packet of designating a record type "A" of IPv4 and querying an address of the host name "hostX" is transmitted from a client terminal to the DNS server, the DNS server searches for an entry including an IPv4 address corresponding to "hostX." Then, the DNS server transmits a packet including the searched IPv4 address to the client terminal. In the example illustrated in FIG. 15, the DNS server transmits the packet including the addresses p and q as the IPv4 address of "hostX" to the client terminal. Hereinafter, a packet of designating a host name and a record type and querying an address corresponding to the host name is referred to as a "DNS query packet."

Meanwhile, in order to introduce a new function of IPv6 into an environment in which a plurality of types of communication devices described above are present, various requirements need to be satisfied. First, in the currently operating existing environment, a problem in which it is difficult to perform communication should not be caused. Further, when both information of IPv4 and information of IPv6 are present, information of new IPv6 may be selected as a priority.

There have been proposed various kinds of methods of performing name resolution in a mixed communication environment of IPv4 and IPv6. FIG. 16 is an explanatory diagram illustrating an example of information stored in a DNS server in a mixed communication environment of IPv4 and IPv6. Hereinafter, a record type of an IPv6 address is referred to as "AAAA," and a record type of an IPv4 address is referred to as "A." FIG. 16 illustrates that a total of four entries, that is, two entries of IPv4 addresses p and q whose record type is "A" and two entries of IPv6 addresses s and t whose record type is "AAAA" are registered to a DNS (domain name system) server with respect to a host name "hostX." Hereinafter, when name resolution is performed in a mixed communication environment of IPv4 and IPv6, the DNS server is assumed to store information illustrated in FIG. 16.

Here, an application programming interface (API) used by a device (for example, a client terminal) that queries an address in a DNS will be described. A resolver library which is a set of low-class APIs performing primitive processing is used for a name resolution process in a DNS. Specifically, in a DNS, a command (for example, nslookup, dig, or host) performing low-class processing of directly extracting data stored in a database included in a server side is included in the resolver library.

Meanwhile, a communication application used in a user land usually uses a high-class API without directly calling the resolver library. The resolver library is used inside the high-class API, but the user needs not be aware of an API in the inside.

Specifically, gethostbyname( ) is used as a high-class API in an IPv4-only communication environment. However, with the appearance of IPv6, gethostbyname( ) corresponding to the IPv4-only communication environment is not used, and getaddrinfo( ) is currently used. getaddrinfo( ) is a function corresponding to protocols (multi-protocol) of both IPv4 and IPv6. In the getaddrinfo( ) function, a record type (specifically, an address family representing the type of a network address) is designated, and a query is performed. As the address family, any one of IPv4(PF_INET), IPv6(PF_I-NET6), and either-is-okay (PF_UNSPEC) is designated. The query result (address) will be returned in the form of a list.

At the application side of the user land, a query is expected to be performed without regard to a record type. However, at the DNS server side, it is necessary to manage both addresses of IPv4 and IPv6. Thus, ultimately, the client side is assumed to perform a query in which PF_UNSPEC is designated as the address family in a state in which the DNS server manages both addresses of IPv4 and IPv6.

Specifically, in the high-class API, a communication application (designating, for example, PF_UNSPEC) is generated without being aware of a record type. Meanwhile, when the high-class API calls the resolver library, the resolver library designates a record type for name resolution and queries the DNS server about an address. It is because an address and a record type are necessary when the DNS server searches for an entry.

FIGS. 17 to 21 are explanatory diagrams illustrating an operation of querying a DNS server about an address in a mixed communication environment of IPv4 and IPv6. Hereinafter, an entry including an IPv4 address is referred to as an "A record," and an entry including an IPv6 address is referred to as an "AAAA record."

A method illustrated in FIG. 17 is a method of first querying a DNS server about an A record corresponding to a host name and then querying an AAAA record after a response is received (that is, after being on standby until a response is received). In the method illustrated in FIG. 17, first, a client transmits a DNS query packet by which a host name "hostX" and a record type "A" are designated to a DNS server. Then, the DNS server searches for corresponding IPv4 addresses p and q, and transmits a packet including the searched addresses to the client. Next, the client that has received the packet including the IPv4 addresses transmits a DNS query packet by which a host name "hostX" and a record type "AAAA" are designated to the DNS server. Then, the DNS server searches for corresponding IPv6 addresses s and t, and transmits a packet including the searched addresses to the client.

A method illustrated in FIG. 18 is a method of first querying a DNS server about an A record corresponding to a host name and determining whether or not to query an AAAA record depending on received response content. In other words, the method illustrated in FIG. 18 is different from the method illustrated in FIG. 17 in that it is determined whether or not to query the AAAA record depending on response content of the IPv4 addresses p and q. In the method illustrated in FIG. 18, first, the client transmits a DNS query packet by which a host name "hostX" and a record type "A" are designated to a DNS server. Then, the DNS server searches for corresponding IPv4 addresses p and q, and transmits a packet including the searched addresses to the client. The client that has received the packet including the IPv4 addresses determines whether or not to transmit a DNS query packet by which a host name "hostX" and a record type "AAAA" are designated to the DNS server depending on content included in the packet. Here, when it is determined that the DNS query packet is to be transmitted to the DNS server, a subsequent process is the same as in the method illustrated in FIG. 17.

A method illustrated in FIG. 19 is a method of first querying a DNS server about an A record corresponding to a host name and then querying an AAAA record without waiting for a response. In the method illustrated in FIG. 19, first, a client transmits a DNS query packet by which a host name "hostX" and a record type "A" are designated to a DNS server. Then, the client transmits a DNS query packet by which a host name "hostX" and a record type "AAAA" are designated to the DNS server before receiving a packet including an IPv4 address. Here, content of the packet to be transmitted from the DNS server to the client according to the received DNS query packet is the same as the content illustrated in FIG. 17.

A method illustrated in FIG. 20 is a method of first querying a DNS server about an AAAA record corresponding to a host name and then querying an A record after a response is received. In other words, the method illustrated in FIG. 20 is different from the method illustrated in FIG. 17 in that sequences of querying the A record and the AAAA record are reversed. Specifically, first, a client transmits a DNS query packet by which a host name "hostX" and a record type "AAAA" are designated to a DNS server. Then, the DNS server searches for corresponding IPv6 addresses s and t, and transmits a packet including the searched addresses to the client. Next, the client that has received the packet including the IPv6 addresses transmits a DNS query packet by which a host name "hostX" and a record type "A" are designated to the DNS server. Then, the DNS server searches for corresponding IPv4 addresses p and q, and transmits a packet including the searched addresses to the client.

A method illustrated in FIG. 21 is a method of first querying a DNS server about an AAAA record corresponding to a host name and then querying an A record without waiting for a response. In the method illustrated in FIG. 21, first, a client transmits a DNS query packet by which a host name "hostX" and a record type "AAAA" are designated to a DNS server. Then, the client transmits a DNS query packet by which a host name "hostX" and a record type "A" are designated to the DNS server before receiving a packet including an IPv6 address. Here, content of the packet to be transmitted from the DNS server to the client according to the received DNS query packet is the same as the content illustrated in FIG. 20.

As described above, when the DNS server stores both entries of the IPv4 address and the IPv6 address corresponding to the host name, the client transmits the DNS query packet by which the host name and the record type of the IPv4 address are designated and the DNS query packet by which the host name and the record type of the IPv6 address are designated, respectively. As a result, the client can acquire both of the IPv4 address and the IPv6 address corresponding to the host name.

A communication device that performs name resolution in an environment in which both an IPv4 address and an IPv6 address are present is discussed in Patent Literature 1. The communication device discussed in Patent Literature 1 first requests a DNS server, which performs name resolution in an IPv4 address space, to perform name resolution. When an IPv4 address has not been obtained, the communication device requests a DNS proxy server, which queries a DNS server performing name resolution in an IPv6 address space, to perform name resolution again.

CITATION LIST

Patent Literature

PTL 1: JP 2010-183242 A

SUMMARY OF INVENTION

Technical Problem

Due to the new introduction of an IPv6-based communication environment, the method used when only an IPv4 address is present remains, and the method of performing a new query for an IPv6 address is added independently of the above method as illustrated in FIGS. 17 to 21. For this reason, as a consequence, a query about one host name has been performed once until now, but in the methods illustrated in FIGS. 17 to 21, a query is performed twice.

Meanwhile, since a query needs to be performed twice, a plurality of query patterns are present as a query pattern of each address. Further, when the method of deciding a subsequent process according to content of a response to a prior query is considered, a processing method becomes more complicated.

In addition, since the server transmits separate responses in response to respective queries, it is difficult for the client to collect the response content at a time. For this reason, one side is on standby until the response is received from the other side, and thus it takes a long time until the reply is completed. In addition, when a case in which a packet used for the query of the other side is lost is considered, the process considering the response content becomes more complicated. Since the process is complicated, a problem that is not expected in the beginning occurs.

Further, since a query is generated twice, a network traffic amount generated by a query becomes twice. The number of queries simply increases by one, but many matters need to be considered.

In the communication device discussed in Patent Literature 1, similarly to the method illustrated in FIG. 18, a query is generated twice or more depending on content of a response to a query of one side. Thus, it is desirable to acquire node information of a plurality of record types by a single query without employing the above-mentioned complicated configuration.

In this regard, an exemplary object of the present invention is to provide a name database server, a name resolution system, an entry search method, a name resolution method, and an entry search program, which are capable of acquiring node information of a plurality of record types by a single query.

Solution to Problem

A name database server according to the present invention includes a node information storage means that stores an entry of node information in which at least an address and a record type are associated with a host name, a search target record deciding means that decides a record type of an entry of a search target from a virtual record type received from a terminal device that transmits a virtual record type and entry specifying information that is information specifying an entry and queries node information corresponding to the entry specifying information based on a search rule that is a rule specifying a record type of a search target according to a virtual record type, an entry searching means that searches the node information storage means, and specifies an entry that corresponds to the entry specifying information received from the terminal device and has the record type decided by the search target record deciding means, and a search result transmitting means that transmits node information included in the entry specified by the entry searching means to the terminal device.

A name resolution system according to the present invention includes a terminal device that performs a query about node information and a name database server that receives a query from the terminal device, in which the terminal device includes an address querying means that transmits entry specifying information specifying an entry stored in the name database server and a virtual record type to the name database server, and performs a query about the node information, and the name database server includes a node information storage means that stores an entry of node information in which at least an address and a record type are associated with a host name, a search target record deciding means that decides a record type of an entry of a search target from a received virtual record type based on a search rule that is a rule specifying a record type of a search target according to a virtual record type, an entry searching means that searches the node information storage means, and specifies an entry that corresponds to the entry specifying information received from the terminal device and has the record type decided by the search target record deciding means, and a search result transmitting means that transmits node information included in the entry specified by the entry searching means to the terminal device.

An entry search method according to the present invention includes deciding a record type of an entry of a search target from a virtual record type received from a terminal device that transmits entry specifying information that is information specifying an entry of node information in which at least an address and a record type are associated with a host name and a virtual record type and queries node information corresponding to the entry specifying information based on a search rule that is a rule specifying a record type of a search target according to a virtual record type, searching a node information storage means storing the entry, and specifying an entry that corresponds to the entry specifying information received from the terminal device and has the decided record type, and transmitting node information included in the specified entry to the terminal device.

A name resolution method according to the present invention includes transmitting, by a terminal device that performs a query about node information, entry specifying information specifying an entry stored in a name database server that transmits node information in response to the query and a virtual record type to the name database server and querying the node information, by the name database server, deciding a record type of an entry of a search target from a received virtual record type based on a search rule that is a rule specifying a record type of a search target according to a virtual record type, searching a node information storage means that stores an entry of node information in which at least an address and a record type are associated with a host name, and specifying an entry that corresponds to the entry specifying information received from the terminal device and has the decided record type, and transmitting node information included in the specified entry to the terminal device.

An entry search program according to the present invention is an entry search program applied to a computer including a node information storage means that stores an entry of node information in which at least an address and a record type are associated with a host name and causes the computer to execute: a search target record deciding process of deciding a record type of an entry of a search target from a virtual record type received from a terminal device that transmits a virtual record type and entry specifying information that is information specifying an entry and queries node information corresponding to the entry specifying information based on a search rule that is a rule specifying a record type of a search target according to a virtual record type, an entry searching process of searching the node information storage means, and specifying an entry that corresponds to the entry specifying information received from the terminal device and has the record type decided by the search target record deciding process, and a search result transmitting process of transmitting node information included in the entry specified by the entry searching process to the terminal device.

Advantageous Effects of Invention

According to the present invention, host information of a plurality of record types can be acquired by a single query.

DESCRIPTION OF EMBODIMENTS

Hereinafter, exemplary embodiments of the present invention will be described with reference to the accompanying drawings.

First Exemplary Embodiment

Figure 1:
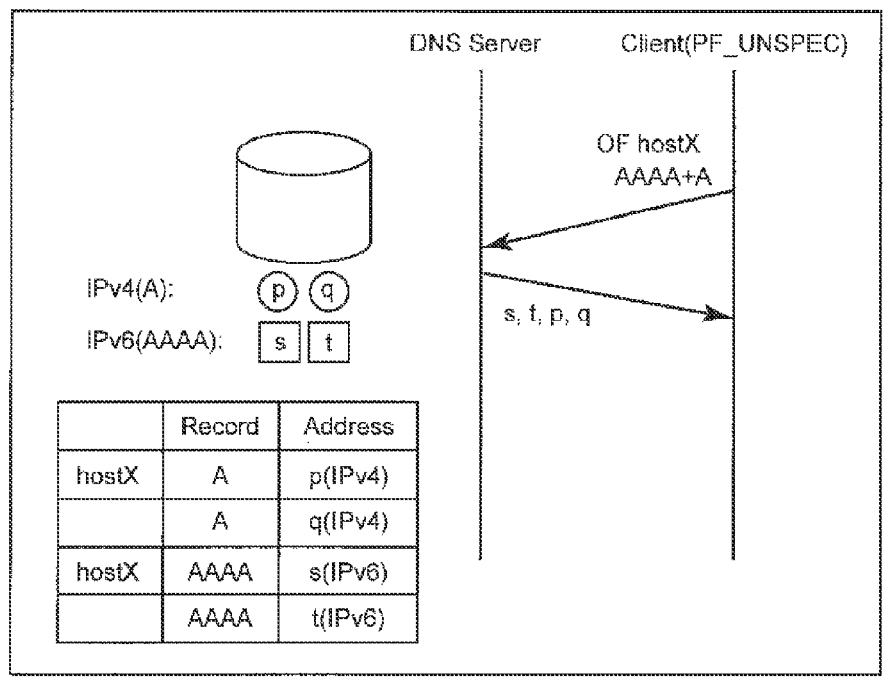
FIG. 1 It depicts an explanatory diagram illustrating an example of an operation of performing name resolution.

First, an outline of a name resolution system according to a first exemplary embodiment will be described with reference to FIG. 1. FIG. 1 is an explanatory diagram illustrating an example of an operation of performing name resolution. In the name resolution system according to the first exemplary embodiment, first, a client transmits a DNS query packet by which a host name ("hostX" in FIG. 1) of a target performing name resolution and a record type ("AAAA+A" in FIG. 1) are designated to a DNS server. Here, the designated record type "AAAA+A" is a virtual record type which is different from a record type stored in a DNS server such as "A" or "AAAA."

Arbitrary information may be set to the virtual record type. For example, a record type which is not present in the existing DNS may be newly defined, and information representing the record type may be used as the virtual record type. In the following description, for the sake of convenience, the virtual record type is referred to as "AAAA+A." Here, the virtual record type is not limited to one type of "AAAA+A," and a plurality of types may be used. The virtual record type is decided in advance by the user or the like. The virtual record type refers to a record type which is designated as a portion designating a record by a query packet but has not originally been defined in the DNS.

Next, the DNS server that has received the DNS query packet decides a record type of a search target according to a predetermined rule corresponding to the designated virtual record type "AAAA+A." Then, the DNS server searches for an entry corresponding to the decided record type and the received host name. In the example of FIG. 1, an entry of record types "AAAA" and "A" is searched. Then, the DNS server transmits a response packet including an IPv6 address and an IPv4 address (s, t, p, and q in FIG. 1) included in the searched entry to the client.

In other words, the name resolution system according to the first exemplary embodiment transmits a packet by which information (for example, a host name and an address; hereinafter, referred to as an "entry specifying information") specifying an entry and the record type "AAAA+A" are designated to the DNS server once and thus can acquire a packet including corresponding node information (for example, an IPv6 address, an IPv4 address, and a host name) at a time. In the following description, an example of resolving a corresponding IP address from a domain name (a lookup case) will be described. Here, the name resolution system according to the present exemplary embodiment can be applied to an example of resolving a corresponding host name from an IP address (a reverse lookup case). Content of the name resolution system according to the first exemplary embodiment will be described below in detail.

Figure 2:
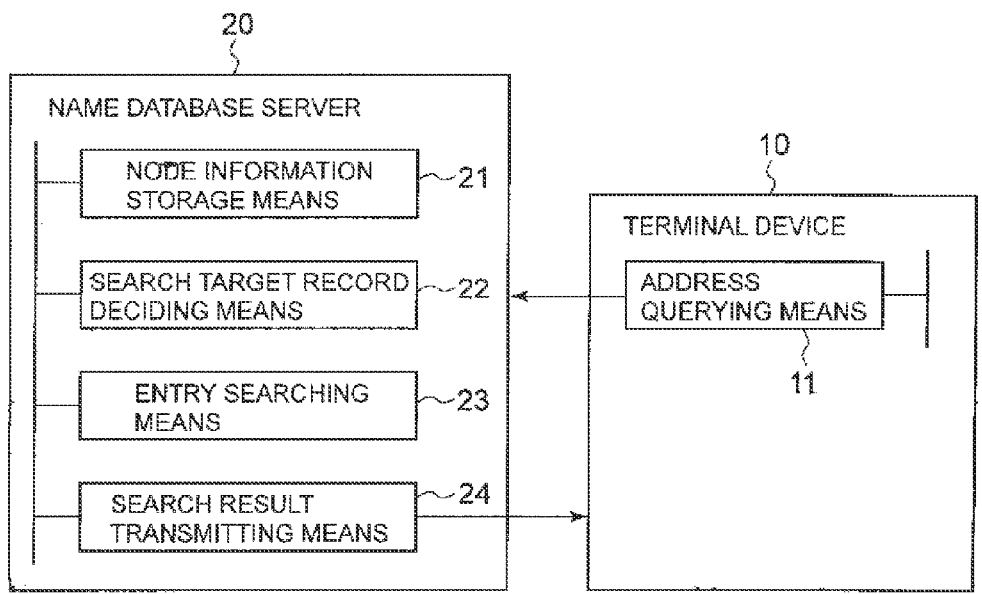
FIG. 2 It depicts a block diagram illustrating an example of the name resolution system according to the first exemplary embodiment of the present invention.

FIG. 2 is a block diagram illustrating an example of the name resolution system according to the first exemplary embodiment of the present invention. The name resolution system according to the present exemplary embodiment includes a terminal device 10 and a name database server 20. For example, the name database server 20 is implemented by a DNS server. However, the name database server 20 is not limited to a DNS server.

The terminal device 10 includes an address querying means 11. The address querying means 11 performs a query about corresponding node information by transmitting the virtual record type and the entry specifying information (for example, a host name or an address of a target performing name resolution) to the name database server 20. Further, predetermined information (that is, the above-described "AAAA+A") that has not been present as the record type stored in a node information storage means 21 which will be described later is designated to the virtual record type.

For example, the address querying means 11 is implemented by a central processing unit (CPU) of a computer (the terminal device 10) operating according to a program.

The entry specifying information to be transmitted from the address querying means 11 to the name database server 20 is not limited to the host name or the address and virtual record type. For example, the address querying means 11 may transmit an address of the terminal device 10 or the like to the name database server 20. For example, the record type about which the address querying means 11 queries the name database server 20 is designated by another high-class API (not illustrated) or the like.

The name database server 20 includes the node information storage means 21, a search target record deciding means 22, an entry searching means 23, and a search result transmitting means 24.

The node information storage means 21 stores an entry of node information in which at least an address and a record type are associated with a host name. Specifically, the node information storage means 21 stores an entry in which at least an IPv6 address and an IPv4 address are associated with a host name. For example, the node information storage means 21 is implemented by a magnetic disk or the like. Information to be associated with each address and record type is not limited to a host name. The node information storage means 21 may store an entry in which another information representing host information of a domain is associated with each address and record type such as a zone file.

For example, entries stored in the node information storage means 21 are sequentially updated using a structure such as a DNS dynamic update.

The search target record deciding means 22 decides a record type of an entry of a search target based on a virtual record type received from the terminal device 10. Specifically, a rule (hereinafter, "search rule") specifying a record type of a search target according to a virtual record type is set in advance. The search target record deciding means 22 decides a record type of an entry of a search target based on the received virtual record type according to the search rule. Specifically, "a record type of a search target is "AAAA" and "A," when a character string "AAAA+A" is designated as a record type" is set as the search rule. Through this setting, the entry searching means 23 which will be described later can search for entries of the record types "AAAA" and "A" even when the virtual record type "AAAA+A" is received.

By searching the node information storage means 21, the entry searching means 23 specifies an entry which corresponds to the received entry specifying information and has a record type decided by the search target record deciding means 22. For example, the search target record deciding means 22 is assumed to decide the record types of the entry of the search target as "AAAA" and "A." In this case, the entry searching means 23 searches the node information storage means 21, and specifies an entry including an IPv4 address and an IPv6 address corresponding to a host name received from the terminal device 10.

As described above, the designated virtual record type is used as information specifying a record type of a search target. In addition, the virtual record type may also be used as information instructing the DNS server to search a search target. In other words, the record type "AAAA+A" undertakes a command instructing the DNS server to search a record type of a search target. Further, it is possible to prevent an existing system from being influenced since a record type different from a record type stored in a DNS server is used when a query is performed.

The search result transmitting means 24 transmits node information included in the entry specified by the entry searching means 23 to the terminal device 10. Further, when an entry of a target has not been present, the search result transmitting means 24 may transmit a packet including information representing that node information corresponding to a host name has not been present to the terminal device 10.

The search target record deciding means 22, the entry searching means 23, and the search result transmitting means 24 are implemented by a CPU of a computer operating according to a program (an entry search program). For example, the program may be stored in a storage unit (not illustrated) of the name database server 20, and the CPU may read the program and operate as the search target record deciding means 22, the entry searching means 23 and the search result transmitting means 24 according to the program. Alternatively, each of the search target record deciding means 22, the entry searching means 23, and the search result transmitting means 24 may be implemented by dedicated hardware.

Next, an operation in which a DNS server transmits both an IPv4 address and an IPv6 address back to a client when the client designates a host name and a record type "AAAA+A" and transmits a query about an address will be described. The client corresponds to the terminal device 10, and the DNS server corresponds to the name database server 20.

Figure 3:
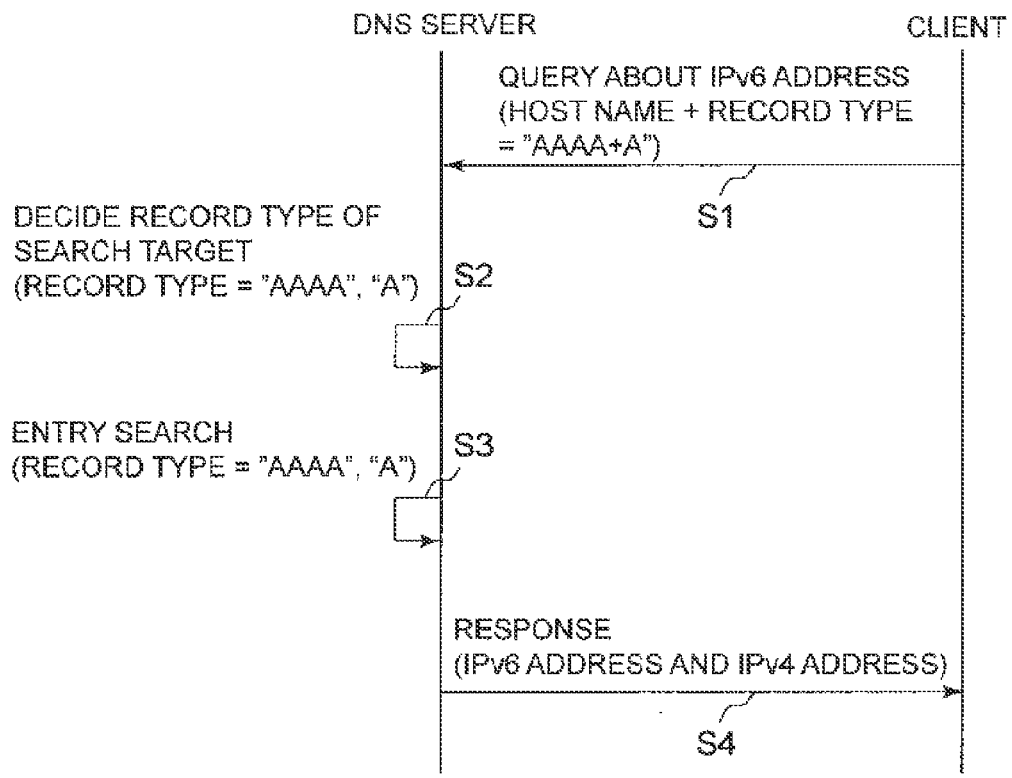
FIG. 3 It depicts a sequence diagram illustrating an example of an operation of performing name resolution.

FIG. 3 is a sequence diagram illustrating an example of an operation of performing name resolution. The address querying means 11 of the client transmits a DNS query packet by which a host name and a virtual record type "AAAA+A" are designated to the DNS server and queries an address on the host name (step S1). Upon receiving the packet including the virtual record type "AAAA+A", the search target record deciding means 22 of the DNS server decides "AAAA" and "A" as a record type of a search target according to a predetermined search rule (step S2).

Next, the entry searching means 23 searches the node information storage means 21, and specifies entries of the record type "AAAA" and "A" corresponding to the received host name (step S3). Specifically, the entry searching means 23 specifies entries including an IPv4 address and an IPv6 address.

Then, the search result transmitting means 24 transmits a packet including an IPv4 address and an IPv6 address of the entries specified by the entry searching means 23 to the client (step S4).

As described above, according to the present exemplary embodiment, the address querying means 11 of the terminal device 10 transmits the virtual record type and the entry specifying information to the name database server 20, and queries node information corresponding to the entry specifying information. The search target record deciding means 22 of the name database server 20 decides a record type of an entry of a search target based on the search rule serving as a rule that specifies a record type of a search target according to a virtual record type. The entry searching means 23 searches the node information storage means 21, and specifies an entry which corresponds to the received entry specifying information and has the record type decided by the search target record deciding means 22. Then, the search result transmitting means 24 transmits node information included in the entry specified by the entry searching means 23 to the terminal device 10.

Thus, node information of a plurality of record types can be acquired by a single query. Specifically, even in the mixed communication environment of IPv4 and IPv6, name resolution on both IPv4 and IPv6 can be performed by querying a host name once. For example, by transmitting a DNS query packet by which a single record type is designated once, addresses of a plurality of record types (both IPv4 and IPv6) corresponding to a host name can be acquired.

Further, since the client side process is completed by performing a single query, it is efficient. Further, each process becomes simple, and thus the occurrence of various problems can be suppressed. Furthermore, the client side waits for a response to a single query compared to when a plurality of queries are performed. Thus, the processing is performed at a high speed. In addition, the traffic amount occurring due to a query is reduced.

Second Exemplary Embodiment

Figure 4:
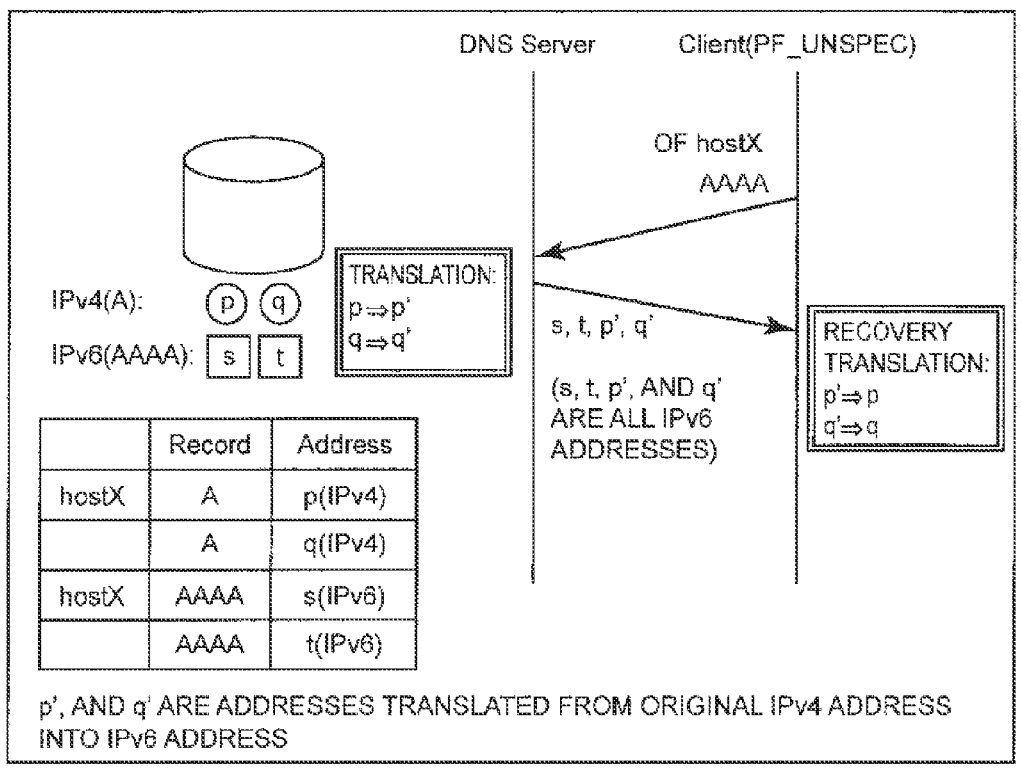
FIG. 4 It depicts an explanatory diagram illustrating an example of an operation of performing name resolution.

Next, an outline of a name resolution system according to a second exemplary embodiment will be described with reference to FIG. 4. FIG. 4 is an explanatory diagram illustrating an example of an operation of performing name resolution. In the name resolution system according to the second exemplary embodiment, first, a client transmits a DNS query packet by which a host name ("hostX" in FIG. 4) of a target performing name resolution and a record type ("AAAA" in FIG. 4) of an IPv6 address are designated to a DNS server. Next, the DNS server that has received the DNS query packet searches for an entry of the record type "A" as well as an entry of the designated record type "AAAA" among entries of the received host name. In the example illustrated in FIG. 4, as a result, addresses p, q, s, and t included in the entries matching the host name "hostX" are specified.

Then, the DNS server translates the IPv4 addresses p and q having the record type "A" into an IPv6 address which is an address of the received record type. Hereinafter, IPv6 addresses translated from the addresses p and q are represented as p' and q'. Then, the DNS server transmits a packet including the IPv6 addresses s, t, p', and q' to the client. The client that has received the IPv6 address translates the translated addresses p' and q' to recover the IPv4 addresses p and q before translation.

As the method of translating an IPv4 address into an IPv6 address, for example, a method of translating the IPv4 address into an IPv4 mapped IPv6 Address (hereinafter, referred to as an "IPv4 mapped Address") is used. A process of translating an IPv4 mapped Address into an IPv4 address is performed by a typical kernel. For this reason, as an IPv4 address is translated into an IPv4 mapped Address, a recovery translating process is not necessary in an application in the user land at the client side.

As described above, the name resolution system according to the second exemplary embodiment transmits the packet by which a host name and a record type of an IPv6 address are designated to the DNS server once and thus can acquire a packet including an address corresponding to the host name through the designated record type at a time. In addition, the translated address is translated to recover the address before translation, and thus the translated address can be used as an original address. Next, content of the name resolution system according to the second exemplary embodiment will be described in detail.

Figure 5:
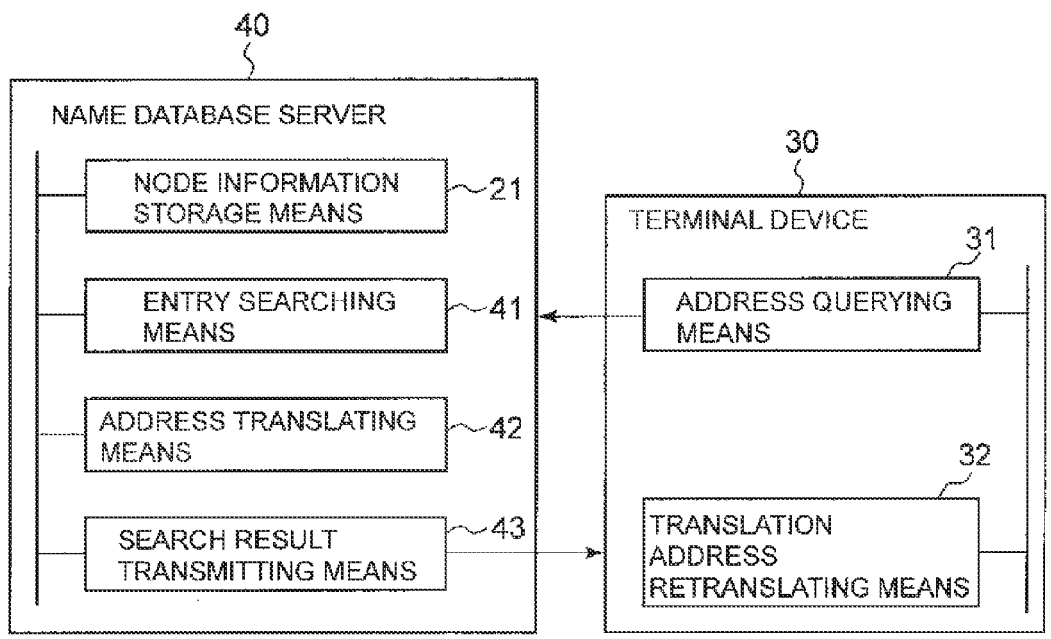
FIG. 5 It depicts a block diagram illustrating an example of the name resolution system according to the second exemplary embodiment of the present invention.

FIG. 5 is a block diagram illustrating an example of the name resolution system according to the second exemplary embodiment of the present invention. The same components as in the first exemplary embodiment are denoted by the same reference numerals as in FIG. 2, and a description thereof will not be made. The name resolution system according to the present exemplary embodiment includes a terminal device 30 and a name database server 40. For example, the name database server 40 is implemented by a DNS server. However, the name database server 40 is not limited to a DNS server.

The name database server 40 includes a node information storage means 21, an entry searching means 41, an address translating means 42, and a search result transmitting means 43. The node information storage means 21 is the same as in the first exemplary embodiment, and thus a description thereof will not be made.

The entry searching means 41 searches the node information storage means 21 and specifies an entry corresponding to a host name received from the terminal device 30. Specifically, when a packet representing the record type "AAAA" is received from the terminal device 30, the entry searching means 41 specifies an entry corresponding to the received host name and the record type "AAAA." Further, the entry searching means 41 specifies an entry corresponding to the received host name and the record type "A."

The address translating means 42 translates an address of a record type different from a record type received from the terminal device 30 among addresses included in the entry specified by the entry searching means 41 into an address of the received record type based on a predetermined rule. Specifically, when the packet representing the record type "AAAA" is received from the terminal device 30, the address translating means 42 translates an address (an IPv4 address) of the record type "A" among addresses included in the entry specified by the entry searching means 41 into an address (an IPv6 address) of the record type "AAAA" based on a predetermined rule. A rule used to translate an address of a record type different from a received record type into an address of the received record type is preferably set in advance for each record type.

For example, a rule by which an IPv4 address is translated into an IPv4 mapped Address may be set as a rule used to translate an IPv4 address into an IPv6 address. Specifically, when the record type "AAAA" is received from the terminal device 30, the address translating means 42 translates an IPv4 address specified by the entry searching means 41 into an IPv6 address based on a format defined as an IPv4 mapped Address.

The definition of the IPv4 mapped Address is stated in the following Reference Literature 1 "2.5.5.2. IPv4-Mapped IPv6 Address." Further, a method (function) of using the IPv4 mapped Address is stated in the following Reference Literature 2. Thus, a detail description thereof will not be made.

<Reference Literature 1> R. Hinden, S. Deering, "IP Version 6 Addressing Architecture", February 2006, RFC4291 (http://www.ietf.org/rfc/rfc4291.txt)<

<Reference Literature 2> M-K. Shin, et al., "Application Aspects of IPv6 Transition", March 2005, RFC4038 (http://www.ietf.org/rfc/rfc4038.txt)

A method of translating an IPv4 address into an IPv6 address is not limited to the method of translating an IPv4 address into an IPv4 mapped Address. Any other translation algorithm may be used as long as an original IPv4 address is extracted at the client side (the terminal device 30). Specifications on the translating method are not limited to the above format as long as the specifications are decided between devices that exchange data. For example, an IPv4 address may be translated into an IPv6 address such that an arbitrary bit pattern is added to front and rear parts of an IPv4 address. It is because an IPv6 address space is extremely large, and so an IPv4 address can easily be included in an IPv6 address space.

The search result transmitting means 43 transmits an address corresponding to the received host name and the record type to the terminal device 30. Specifically, the search result transmitting means 43 transmits the address translated by the address translating means 42 and an address which is not translated by the address translating means 42 among addresses included in the entry specified by the entry searching means 41 to the terminal device 30. Further, when it is difficult for the entry searching means 41 to specify an entry, the search result transmitting means 43 preferably transmits a packet including information representing that an address corresponding to a host name has not been present to the terminal device 30.

As described above, the name database server 40 according to the present exemplary embodiment translates an address according to the query received from the terminal device 30. For this reason, the name resolution method according to the present exemplary embodiment can be called a dynamic translation method. For example, information understood for the first time when DNS query is performed is used in a rule for address translation, the dynamic translation method is effective.

The entry searching means 41, the address translating means 42, and the search result transmitting means 43 are implemented by a CPU of a computer operating according to a program (an entry search program). Further, each of the entry searching means 41, the address translating means 42, and the search result transmitting means 43 may be implemented by dedicated hardware.

The terminal device 30 includes an address querying means 31 and a translation address retranslating means 32. The address querying means 31 transmits a record type and a host name of a target performing name resolution to the name database server 40, and performs a query about an address corresponding to the host name. For example, a record type "AAAA" representing an IPv6 address is designated as the record type.

The translation address retranslating means 32 translates an address translated based on a predetermined rule among addresses included in the packet received from the name database server 40 into the address before translation. Specifically, the translation address retranslating means 32 translates the address in which the IPv4 address is translated into the IPv6 address into the IPv4 address before translation.

The translation address retranslating means 32 may specify an address having a predetermined format among the received addresses as an address to be translated into the address before translation. For example, the address translating means 42 is assumed to translate an IPv4 address into an IPv6 address according to the format of the IPv4 mapped Address. In this case, the translation address retranslating means 32 may specify an address with the format of the IPv4 mapped Address among the received IPv6 addresses as an address of a translation target. At this time, the translation address retranslating means 32 preferably translates an IPv6 address with the format of the IPv4 mapped Address into the IPv4 address before translation.

Generally, when a communication application of the user land uses the IPv4 mapped Address, the kernel determines whether or not the address is the IPv4 mapped Address. Then, when it is determined that the address is the IPv4 mapped Address, the kernel recognizes the address and translates the address into an IPv4 address.

Typically, a general kernel has this function. For this reason, when the existing structure (kernel) and the IPv4 mapped Address are used, it is unnecessary for an application of the client to perform another recovery translating process (that is, the process of translating an IPv6 address into an IPv4 address). Thus, the communication application side needs not be aware whether an IPv6 address is an IPv4 mapped Address or a typical IPv6 address, and needs not perform a translation process. In other words, even when an IPv6 address is mixed with the IPv4 mapped Address and the typical IPv6 address, the communication application side can handle the IPv6 address, similarly to the typical IPv6 address. In other words, when the communication application side uses the IPv4 mapped Address, an IPv6 address can automatically be translated into an IPv4 address. Thus, when an IPv4 address is translated into an IPv6 address, it is preferable that an IPv4 address be translated into an IPv4 mapped Address.

The address querying means 31 is the same as the address querying means 11 according to the first exemplary embodiment, and thus a description thereof will not be made.

The address querying means 31 and the translation address retranslating means 32 are implemented by a CPU of a computer operating according to a program (name resolution program). Each of the address querying means 31 and the translation address retranslating means 32 may be implemented by dedicated hardware.

Next, an operation in which a DNS server transmits an IPv6 address and an address in which an IPv4 address is translated into an IPv6 address back to a client when the client designates a host name and a record type "AAAA" and transmits a query about an address will be described. The client corresponds to the terminal device 30, and the DNS server corresponds to the name database server 40.

Figure 6:
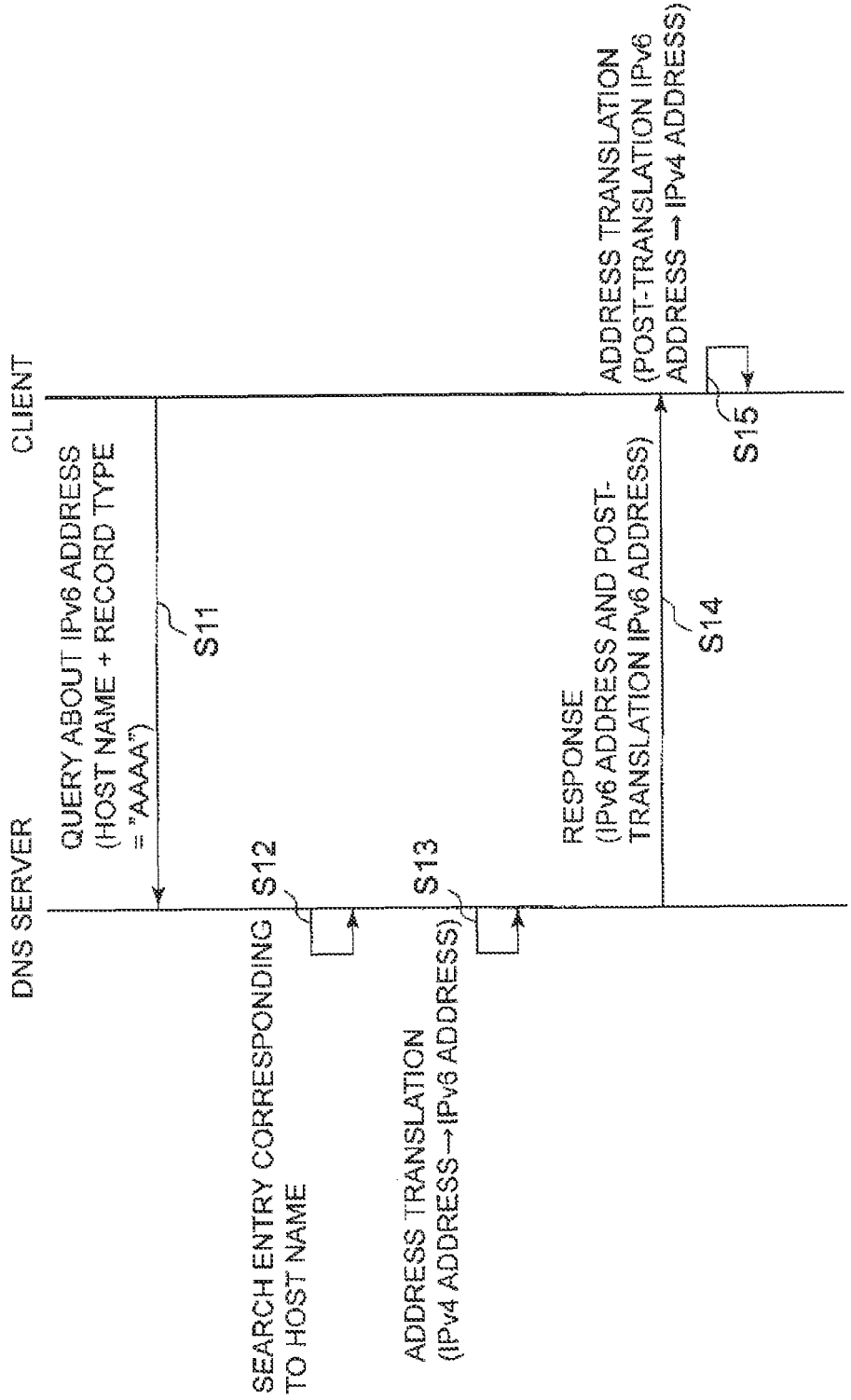
FIG. 6 It depicts a sequence diagram illustrating an example of an operation of performing name resolution.

FIG. 6 is a sequence diagram illustrating an example of an operation of performing name resolution. The address querying means 31 of the client transmits a DNS query packet by which a host name and a record type "AAAA" are designated to the DNS server and queries an address on the host name (step S11). Upon receiving DNS query packet from the client, the entry searching means 41 of the DNS server searches the node information storage means 21, and specifies an entry corresponding to the received host name (step S12). Specifically, the entry searching means 41 specifies an entry including an IPv6 address and an IPv4 address corresponding to the host name. Next, the address translating means 42 translates an IPv4 address into an IPv6 address among addresses included in the entry specified by the entry searching means 41 based on a predetermined rule (step S13). Then, the search result transmitting means 43 transmits a packet including an address corresponding to the host name to the client (step S14).

When the client receives the packet including the address, the translation address retranslating means 32 translates the IPv4 address translated into the IPv6 address among the addresses received from the DNS server into the IPv4 address before translation (step S15).

As described above, according to the present exemplary embodiment, the address querying means 31 of the terminal device 30 transmits a record type and a host name of a target performing name resolution to the name database server 40, and queries an address corresponding to the host name. The entry searching means 41 searches the node information storage means 21, and specifies an entry corresponding to the host name received from the terminal device 30. The address translating means 42 translates an address of a record type different from the record type received from the terminal device 30 among addresses included in the entry specified by the entry searching means 41 into an address of the received record type based on a predetermined rule. Then, the search result transmitting means 43 transmits the address of the received record type included in the specified entry and the address translated by the address translating means 42 to the terminal device 30.

Specifically, the address querying means 31 transmits a record type "AAAA" and a host name of a target performing name resolution to the name database server 40, and queries an address corresponding to the host name. The entry searching means 41 searches the node information storage means 21, and specifies an entry corresponding to the host name received from the terminal device 30 and the record type "AAAA." Further, the entry searching means 41 specifies an entry corresponding to the host name received from the terminal device 30 and the record type "A." The address translating means 42 translates an IPv4 address into an IPv6 address based on a predetermined rule. Then, the search result transmitting means 43 transmits the IPv6 address included in the specified entry and the IPv6 address translated by the address translating means 42 to the terminal device 30.

Through the above-described configuration, similarly to the effects of the first exemplary embodiment, even in the mixed communication environment of IPv4 and IPv6, name resolution on both IPv4 and IPv6 can be performed by querying a host name once.

Further, the translation address retranslating means 32 translates an address translated based on a predetermined rule among addresses received from the name database server 40 into the address before translation. Thus, the terminal device 30 can acquire an address of the required record type and use the address before translation.

Further, when the terminal device 30 designates a record type representing an IPv6 address as a record type, the address translating means 42 may translate an IPv4 address extracted from the node information storage means 21 into an IPv4 mapped Address. In this case, a translation function of an IPv4 mapped Address and an IPv4 address implemented in the typical kernel can be used. For this reason, another recovery translating process needs not be added to the client application side. Thus, influence on a plurality of client applications can be suppressed. Further, in this case, since an appropriate measure can be taken by implementing the function according to the present exemplary embodiment at the name database server 40 (for example, the DNS server) side, and an influence range can be reduced.

Next, a modified example of the second exemplary embodiment will be described. The second exemplary embodiment has been described in connection with the example in which the address translating means 42 translates an IPv4 address into an IPv6 address, and the translation address retranslating means 32 translates a post-translation IPv6 address into an IPv4 address before translation. In this modified example, an example in which the address translating means 42 performs other processing as well as address translation will be described.

In the second exemplary embodiment, when a query about an address corresponding to a host name is received from the terminal device 30, the address translating means 42 performs a process of translating an address. In this modified example, the address translating means 42 performs a process (hereinafter, referred to as a "specifying process") of causing a query result to be used by only a specific terminal device in addition to the process of translating an address. At this time, the translation address retranslating means 32 performs a process corresponding to the specifying process. Hereinafter, a process of causing a query result which has been subjected to the specifying process to become a usable state is referred to as a "recovery translating process."

When specifications on the specifying process are agreed between the terminal device 30 and the name database server 40, although the terminal device 30 has performed the specifying process, the name database server 40 can recognize the recovery translating process on the performed specifying process. However, the terminal device 30 that does not know the specifying process by the name database server 40 does not know a method of coping with the specifying process, and thus it is difficult to use information which has been subjected to the specifying process. As described above, an agreement on the specifying process is performed between the terminal device 30 and the name database server 40, and thus a terminal that performs address translation or the specifying process can be limited to a specific client (the terminal device 30) that has performed the agreement.

Further, the address translating means 42 may perform the specifying process that causes the recovery translating process to be performed by any device. In this case, the address translating means 42 adds additional information which can be recognized by only the specific terminal device 30 to information which has been subjected to the recovery process. For example, the address translating means 42 may add the additional information to a tail part of the information, and may add the additional information in a watermark manner. This method can be called a check digit method or an invisible ink method. The terminal device 30 that recognizes the check digit method or the invisible ink method can use the additional information.

Further, the address translating means 42 may perform a process of encrypting information using a specific key possessed by the terminal device 30 performing the recovery translating process as the specifying process when address translation is performed. At this time, for example, encapsulating security payload (ESP) using a public key encryption scheme or authentication header (AH) using a public key encryption scheme is used as a protocol for an encryption process and an authentication process. At this time, the terminal device 30 may decrypt information using a decryption key corresponding to the specific key possessed by the terminal device 30 as the recovery translating process. However, the protocol used for the encryption process and the authentication process is not limited to the above content.

Further, the name resolution system may use an authentication scheme based on challenge/response authentication for the specifying process. Specifically, when the terminal device 30 (specifically, the address querying means 31) transmits an authentication request to the name database server 40, the name database server 40 (for example, the address translating means 42) transmits a challenge back thereto. Then, the address querying means 31 generates a response in which the received challenge and a password are converted according to a specific algorithm, and transmits the response to the name database server 40. The address translating means 42 generates a response based on the transmitted challenge and a previously registered password of the terminal device 30 in the same manner. Then, when the response matches the response received from the terminal device 30, the address translating means 42 performs address translation.

Besides, the name resolution system may use an authentication method based on a check digit or an authentication method using a one-time password for the specifying process. The authentication scheme based on the challenge/response authentication, the authentication method based on a check digit, and the authentication method using a one-time password are widely known, and thus a detailed description thereof will not be made.

Next, the recovery process performed by the terminal device 30 will be described. The process of translating an IPv4 address into an IPv4 mapped Address described in the second exemplary embodiment is usually performed in the kernel. For this reason, it is unnecessary for the application of the user land to be aware of this translation process. However, when the terminal device 30 performs processing other than the process of translating into the IPv4 mapped Address, a portion that receives a response packet to a DNS query or a transfer destination of the response packet executes the recovery translating process.

The response packet is received by the resolver library. For this reason, the recovery translating process is preferably implemented in the resolver library. The resolver library other than the kernel is the process in the user land. However, as the recovery translating process is implemented in the resolver library commonly used by communication applications, efforts of adding the recovery translating process to individual communication applications can be reduced.

As described above, as processing other than the address translating process is performed by the terminal device 30 and the name database server 40, the name resolution system can have a new added value in addition to the name resolution.

Third Exemplary Embodiment

Figure 7:
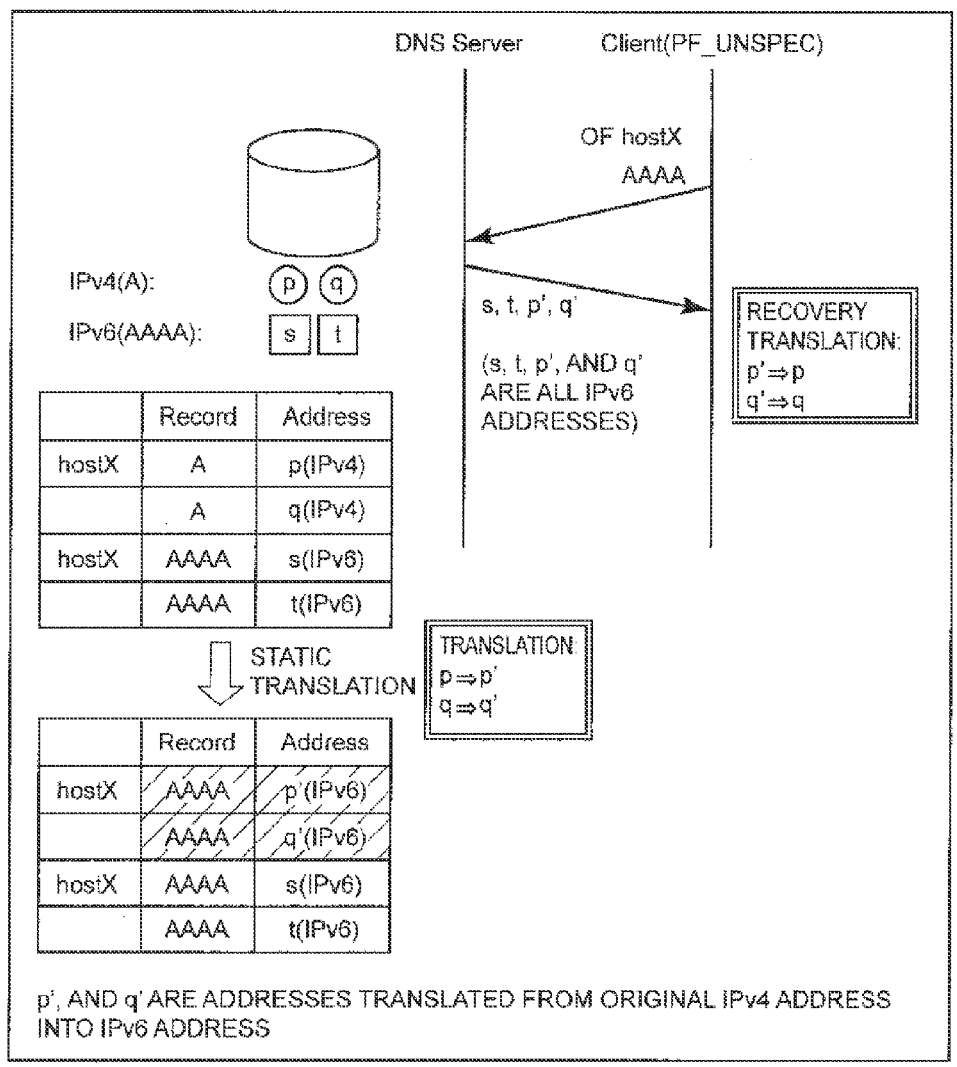
FIG. 7 It depicts an explanatory diagram illustrating an example of an operation of performing name resolution.

Next, an outline of a name resolution system according to a third exemplary embodiment will be described with reference to FIG. 7. FIG. 7 is an explanatory diagram illustrating an example of an operation of performing name resolution. The name resolution system according to the third exemplary embodiment generates an entry in which an IPv4 address is translated into an IPv6 address in advance when entries of both an IPv6 address and an IPv4 address are present on a host name. Specifically, FIG. 7 illustrates that IPv4 addresses p and q are translated (static-translated) into IPv6 addresses p' and q' at a predetermined timing, and then held in a magnetic disk or the like. In a table, a hatched portion represents a translated record.

In this state, first, a client transmits DNS query packet by which a host name ("hostX" in FIG. 7) of a target performing name resolution and a record type ("AAAA" in FIG. 7) of an IPv6 address are designated to a DNS server. Next, the DNS server that has received the DNS query packet searches for an entry corresponding to the received host name and the record type "AAAA." In the example of FIG. 7, as a result, addresses s, t, p', and q' of the entry corresponding to the host name "hostX" and the record type "AAAA" are specified. Then, the DNS server transmits a packet including the IPv6 addresses s, t, p', and q' to the client. The client that has received the IPv6 addresses translates the translated addresses p' and q' to recover the IPv4 addresses p and q before translation.

As the method of translating an IPv4 address into an IPv6 address, for example, a method of translating the IPv4 address into an IPv4 mapped IPv6 Address (hereinafter, referred to as an "IPv4 mapped Address") is used. The process of translating an IPv4 mapped Address into an IPv4 address is usually performed in the kernel, and thus as an IPv4 address is translated into an IPv4 mapped Address, an application in the user land at the client side needs not perform the recovery translating process.

As described above, the name resolution system according to the third exemplary embodiment transmits the packet by which a host name and a record type of an IPv6 address are designated to the DNS server once and thus can acquire a packet including an address corresponding to the host name through the designated record type at a time. In addition, the translated address is translated to recover the address before translation, and thus the translated address can be used as an original address. Next, content of the name resolution system according to the third exemplary embodiment will be described in detail.

Figure 8:
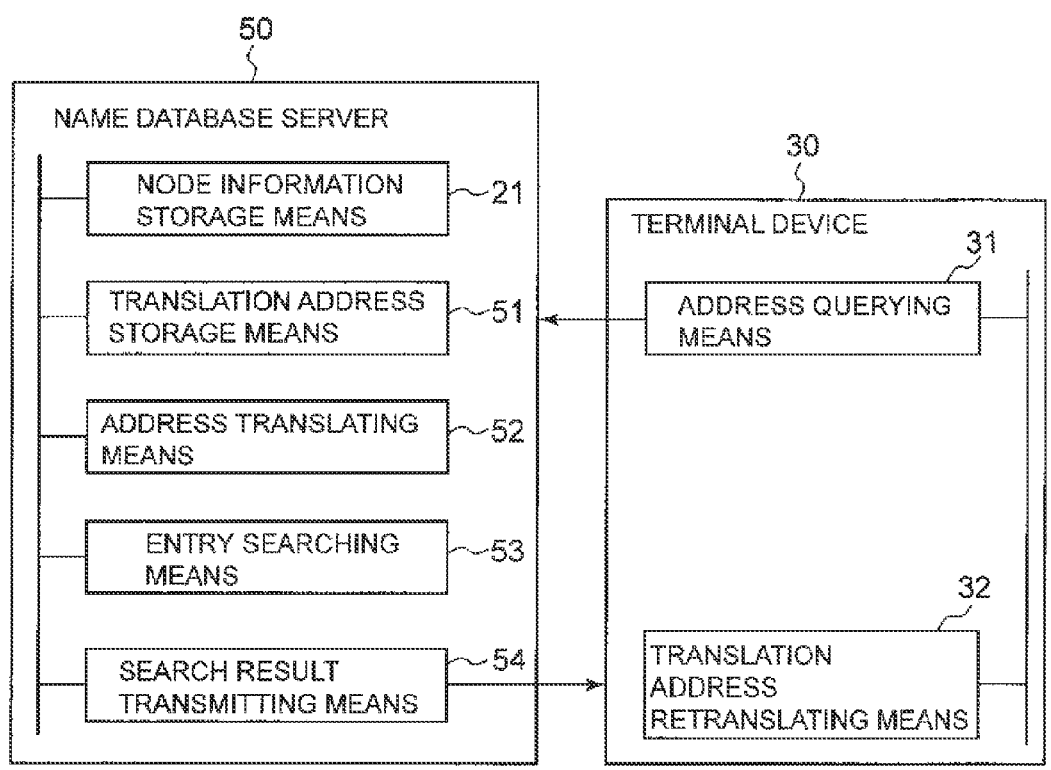
FIG. 8 It depicts a block diagram illustrating an example of the name resolution system according to the third exemplary embodiment of the present invention.

FIG. 8 is a block diagram illustrating an example of the name resolution system according to the third exemplary embodiment of the present invention. The same components as in the second exemplary embodiment are denoted by the same reference numerals as in FIG. 5, and a description thereof will not be made. The name resolution system according to the present exemplary embodiment includes a terminal device 30 and a name database server 50. The terminal device 30 is the same as in the second exemplary embodiment, and thus a description thereof will not be made.

The name database server 50 includes a node information storage means 21, a translation address storage means 51, an address translating means 52, an entry searching means 53, and a search result transmitting means 54. The node information storage means 21 is the same as in the first and second exemplary embodiments, and thus a description thereof will not be made.

The translation address storage means 51 stores an entry in which an address (hereinafter, referred to as a "translation address") in which an IPv4 address stored in the node information storage means 21 is translated into an IPv6 address and an IPv6 address stored in the node information storage means 21 are associated with a host name. For example, the translation address storage means 51 is implemented by a magnetic disk or the like. Further, information associated with each address is not limited to a host name. The translation address storage means 51 may store an entry in which another information representing host information of a domain is associated with each address such as a zone file, similarly to the node information storage means 21. The entry stored in the translation address storage means 51 is stored by the address translating means 52 which will be described later.

The address translating means 52 translates an address of one record type among addresses stored in the node information storage means 21 into an address of another record type based on a predetermined rule. Then, the address translating means 52 causes both an entries including a translated address and an entry including a non-translated address among entries stored in the node information storage means 21 to be stored in the translation address storage means 51.

Specifically, the address translating means 52 translates an IPv4 address stored in the node information storage means 21 into an IPv6 address based on a predetermined rule. Then, the address translating means 52 causes both an entry including a translated IPv6 address (that is, translation address) and an entry including a non-translated IPv6 address stored in the node information storage means 21 to be stored in the translation address storage means 51.

The address translating means 52 may translate an address at predetermined intervals or a predetermined timing. Alternatively, the address translating means 52 may translate the address at a timing at which an entry is added to the node information storage means 21. Further, an entry stored in the translation address storage means 51 by the address translating means 52 may be a difference from a previous translation process or all entries serving as a target.

The entry searching means 53 searches the translation address storage means 51, and specifies an entry corresponding to a host name and record type received from the terminal device 30. For example, when the record type "AAAA" is received from the terminal device 30, the entry searching means 53 specifies an entry (that is, an entry including an IPv6 address) whose record type is "AAAA" among entries corresponding to a host name.

The search result transmitting means 54 transmits an address corresponding to a host name to the terminal device 30. Specifically, the search result transmitting means 54 transmits an address included in an entry specified by the entry searching means 53 to the terminal device 30. Further, when it is difficult for the entry searching means 53 to specify an entry, the search result transmitting means 54 may transmit information representing that an address corresponding to a host name has not been present to the terminal device 30.

The present exemplary embodiment is different from the second exemplary embodiment in that a post-translation address is stored in the translation address storage means 51 in advance. In other words, the name database server 50 according to the present exemplary embodiment translates and stores an address in advance regardless of the presence or absence of a query from the terminal device 30. For this reason, the name resolution method according to the present exemplary embodiment can be called a static translation method.

Further, the present exemplary embodiment has been described in connection with the example in which the name database server 50 includes the node information storage means 21 and the translation address storage means 51. As described above, as the node information storage means 21 is separated from the translation address storage means 51, it is unnecessary to change the structure to update an entry of a zone file (corresponding to the node information storage means 21) when applied to a general DNS. Then, in the process of specifying an entry, it is sufficient that a search destination of an entry is merely changed from the zone file to the translation address storage means 51.

Alternatively, the name database server 50 may include only the node information storage means 21. In this case, for example, when an entry of a zone file (corresponding to the node information storage means 21) is updated by applying a DNS dynamic update, the address translating means 52 may translate a record type together and then cause an entry including a translated address to be stored in the node information storage means 21. As described above, as a record type is translated together before an entry is updated on the node information storage means 21, it is unnecessary to change a search destination of an entry. Thus, the existing DNS can be used as is.

The address translating means 52 may use a rule of translating an IPv4 address into an IPv4 mapped Address as a predetermined rule. The IPv4 mapped Address is one in which an IPv4 address is translated into an IPv6 address. For this reason, a problem does not occur when a translated address is registered to a database of a DNS.

The method of translating an IPv4 address into an IPv6 address at a predetermined timing as necessary and holding the translated IPv6 address can be called a hybrid translation method. The reality of the hybrid translation method is a dynamic translation method. The static translation method can be regarded as a method (hereinafter, referred to as a "prior translation method") of translating information of a file (which may be a database information file) including address information in advance. In the dynamic translation method, it is unnecessary to be aware of whether information stored as database information serving as a target is information translated by the prior translation method or information translated by the static translation method. In other words, the static translation method and the dynamic translation method are translation methods independently of each other. Meanwhile, the hybrid translation method is a method in which both the static translation method and the dynamic translation method are enabled.

The present exemplary embodiment has been described in connection with the example in which the name database server 50 includes the address translating means 52, and the address translating means 52 translates an address stored in the node information storage means 21 at a predetermined timing, and causes an entry including the translated address to be stored in the translation address storage means 51. However, an external device (not illustrated) may translate an address stored in the node information storage means 21 at a predetermined timing, and cause an entry including the translated address to be stored in the translation address storage means 51. In this case, the name database server 50 may not include the address translating means 52.

The address translating means 52, the entry searching means 53, and the search result transmitting means 54 are implemented by a CPU of a computer operating according to a program (an entry search program). Further, each of the address translating means 52, the entry searching means 53, and the search result transmitting means 54 may be implemented by dedicated hardware.

Next, an operation in which a DNS server transmits an IPv6 address and an address in which an IPv4 address is translated into an IPv6 address back to a client when the client designates a host name and a record type "AAAA" and transmits a query about an address will be described. The client corresponds to the terminal device 30, and the DNS server corresponds to the name database server 50.

Figure 9:
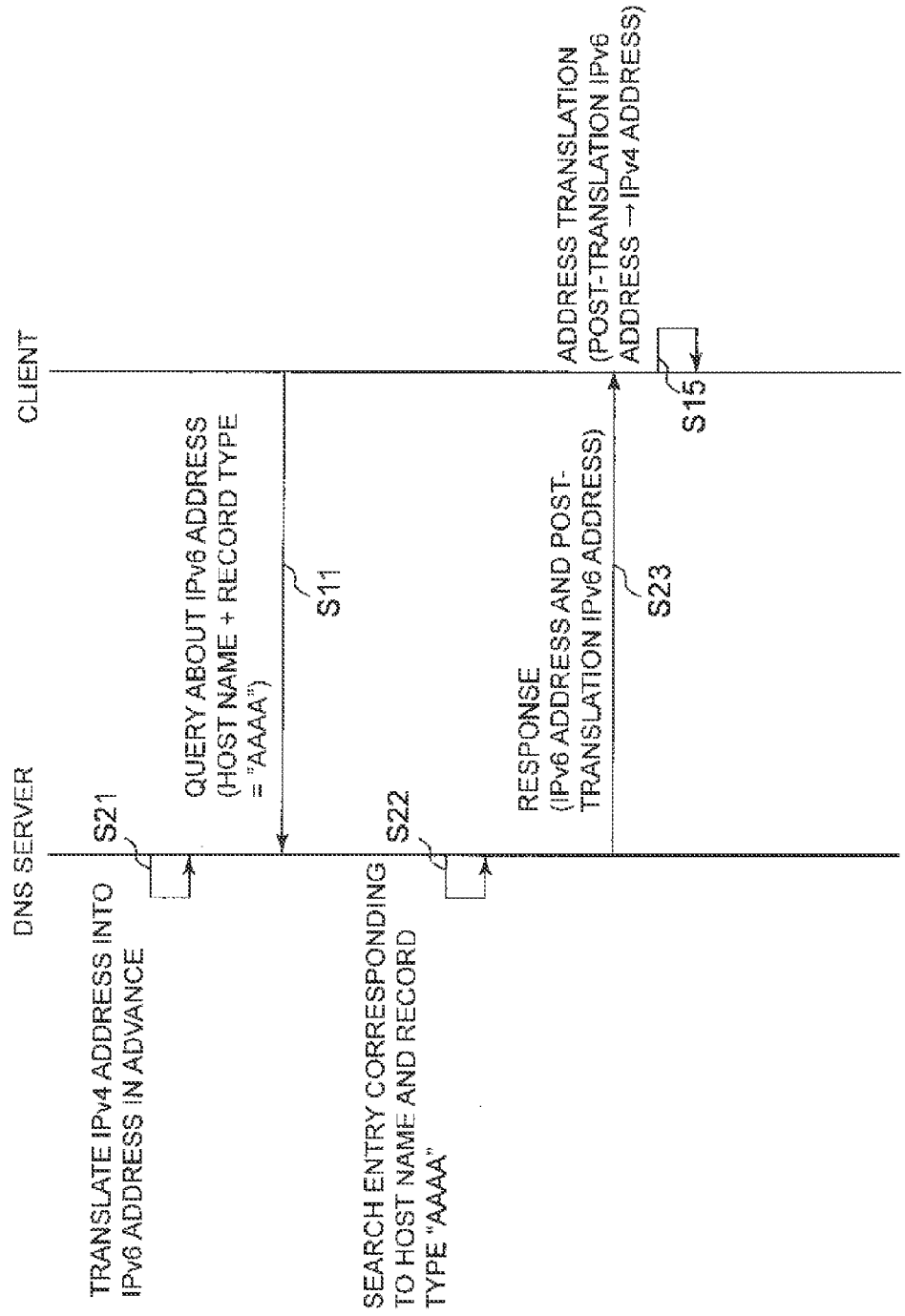
FIG. 9 It depicts a sequence diagram illustrating an example of an operation of performing name resolution.

FIG. 9 is a sequence diagram illustrating an example of an operation of performing name resolution. In the DNS server, the address translating means 52 translates an IPv4 address stored in the node information storage means 21 into an IPv6 address at a predetermined timing. Then, the address translating means 52 causes an entry including the translated IPv6 address to be stored in the translation address storage means 51 (step S21).

Meanwhile, the address querying means 31 of the client transmits a DNS query packet in which a host name and a record type "AAAA" are designated to the DNS server, and queries an address corresponding to the host name (step S11). Upon receiving the DNS query packet from the client, the entry searching means 53 searches the translation address storage means 51, and specifies an entry corresponding to the received host name and the record type "AAAA" (step S22). Then, the search result transmitting means 54 transmits a packet including an address of the specified entry to the client (step S23).

When the client receives the packet including the address, the translation address retranslating means 32 translates the IPv4 address translated into the IPv6 address among the addresses received from the DNS server into the IPv4 address before translation (step S15).

As described above, according to the present exemplary embodiment, the translation address storage means 51 stores an entry in which an address (that is, a translation address) in which an address (an IPv4 address) of a first record type is translated into an address (IPv6 address) of a second record type based on a predetermined rule and the second record type are associated with a host name. Then, when the second record type (IPv6 address) is received from the terminal device 30, the entry searching means 53 searches the translation address storage means 51, and specifies an entity of the second record type ("AAAA") corresponding to the host name. Then, the search result transmitting means 54 transmits the address (IPv6 address) of the second record type included in the specified entry to the terminal device 30. Thus, similarly to the effects of the first exemplary embodiment, even in the mixed communication environment of IPv4 and IPv6, name resolution on both IPv4 and IPv6 can be performed by querying a host name once.

In addition, the name database server 50 stores a previously translated address. For this reason, in addition to the effects of the second exemplary embodiment, it is unnecessary to perform the translating process each time a query is received from the terminal device 30. Thus, an effect by which a load of the name database server 50 (DNS server) is reduced is obtained.

Further, the address translating means 52 may translate the address (IPv4 address) of the first record type into the address (IPv6 address) of the second record type based on a predetermined rule. Then, the address translating means 52 may cause the translated address to be stored in the node information storage means 21.

Fourth Exemplary Embodiment

Figure 10:
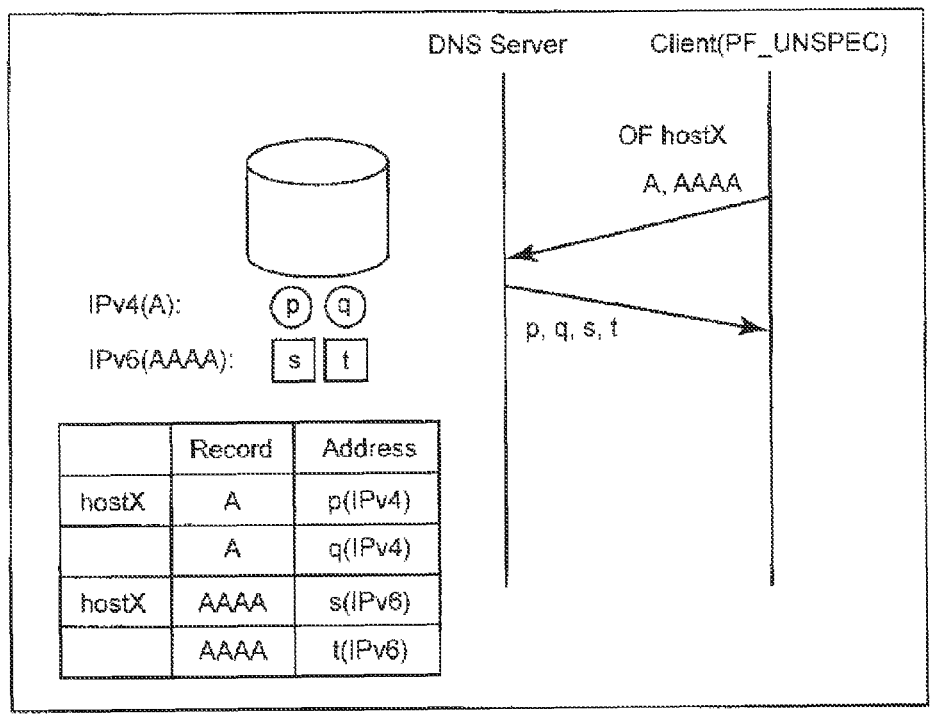
FIG. 10 It depicts an explanatory diagram illustrating an example of an operation of performing name resolution.

Next, an outline of a name resolution system according to a fourth exemplary embodiment will be described with reference to FIG. 10. FIG. 10 is an explanatory diagram illustrating an example of an operation of performing name resolution. In the name resolution system according to the fourth exemplary embodiment, first, a client transmits a DNS query packet by which a host name ("hostX" in FIG. 10) of a target performing name resolution and a record type ("A, AAAA" in FIG. 10) of an IPv4 address and an IPv6 address are designated to a DNS server. Next, the DNS server that has received the DNS query packet searches for an entry of the designated record type "A" and an entry of the record type "AAAA" among entries of the received host name. In the example illustrated in FIG. 10, as a result, addresses p, q, s, and t included in entries matching the host name "hostX" and the designated record types are specified. Then, the DNS server transmits a packet including the addresses p, q, s, and t to the client.

In a general DNS, when a query about an address is performed, a plurality of record types are not designated. However, in the name resolution system according to the fourth exemplary embodiment, by transmitting the packet by which the host name and a plurality of record types are designated to the DNS server once, a packet including an address corresponding to the host name can be acquired at a time. Further, in the fourth exemplary embodiment, since the translating process is not performed on an address, the client side that has received the address needs not translate the received address. Next, content of the name resolution system according to the fourth exemplary embodiment will be described in detail.

Figure 11:
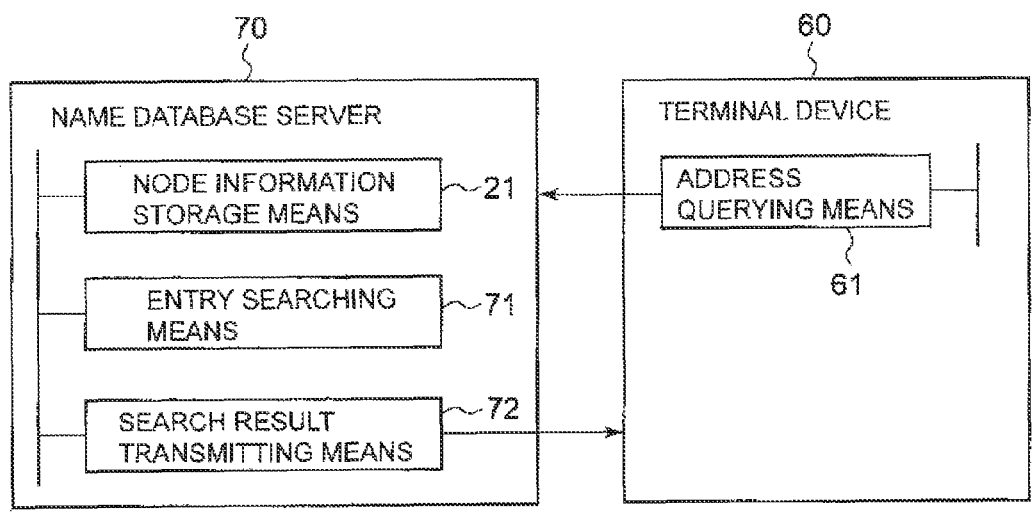
FIG. 11 It depicts a block diagram illustrating an example of the name resolution system according to the fourth exemplary embodiment of the present invention.

FIG. 11 is a block diagram illustrating an example of the name resolution system according to the fourth exemplary embodiment of the present invention. The same components as in the first exemplary embodiment are denoted by the same reference numerals as in FIG. 2, and a description thereof will not be made. The name resolution system according to the present exemplary embodiment includes a terminal device 60 and a name database server 70. For example, the name database server 70 is implemented by a DNS server. However, the name database server 70 is not limited to a DNS server.

The terminal device 60 includes an address querying means 61. The address querying means 61 transmits a host name and a plurality of record types to the name database server 70, and performs a query about an address corresponding to the host name. A record type stored in the node information storage means 21 is designated as a record type to be transmitted. Specifically, the address querying means 61 transmits a host name and "A" and "AAAA" (that is, a record type representing an IPv4 address and a record type representing an IPv6 address) to the name database server 70. For example, the address querying means 61 is implemented by a CPU of a computer (the terminal device 60) operating according to a program.

The name database server 70 includes a node information storage means 21, an entry searching means 71, and a search result transmitting means 72. The node information storage means 21 is the same as in the first exemplary embodiment, and thus a description thereof will not be made.

The entry searching means 71 searches the node information storage means 21, and specifies an entry of a record type that matches a host name received from the terminal device 60 and matches any one of a plurality of record types. For example, the entry searching means 71 receives the packet including the host name and the record types "A" and "AAAA" from the terminal device 60. At this time, the entry searching means 71 searches the node information storage means 21, and specifies an entry that corresponds to the host name and has the record type of "A" or "AAAA."

The search result transmitting means 72 transmits an address of the entry specified by the entry searching means 71 to the terminal device 60. Here, when an entry of a target has not been present, the search result transmitting means 72 may transmit a packet including information representing that an address corresponding to the host name has not been present to the terminal device 60.

The entry searching means 71 and the search result transmitting means 72 are implemented by a CPU of a computer operating according to a program (an entry search program). Further, each of the entry searching means 71 and the search result transmitting means 72 may be implemented by dedicated hardware.

Next, an operation in which a DNS server transmits both an IPv4 address and an IPv6 address back to a client when the client designates a host name and record types "A" and "AAAA" and transmits a query about an address will be described. The client corresponds to the terminal device 60, and the DNS server corresponds to the name database server 70.

Figure 12:
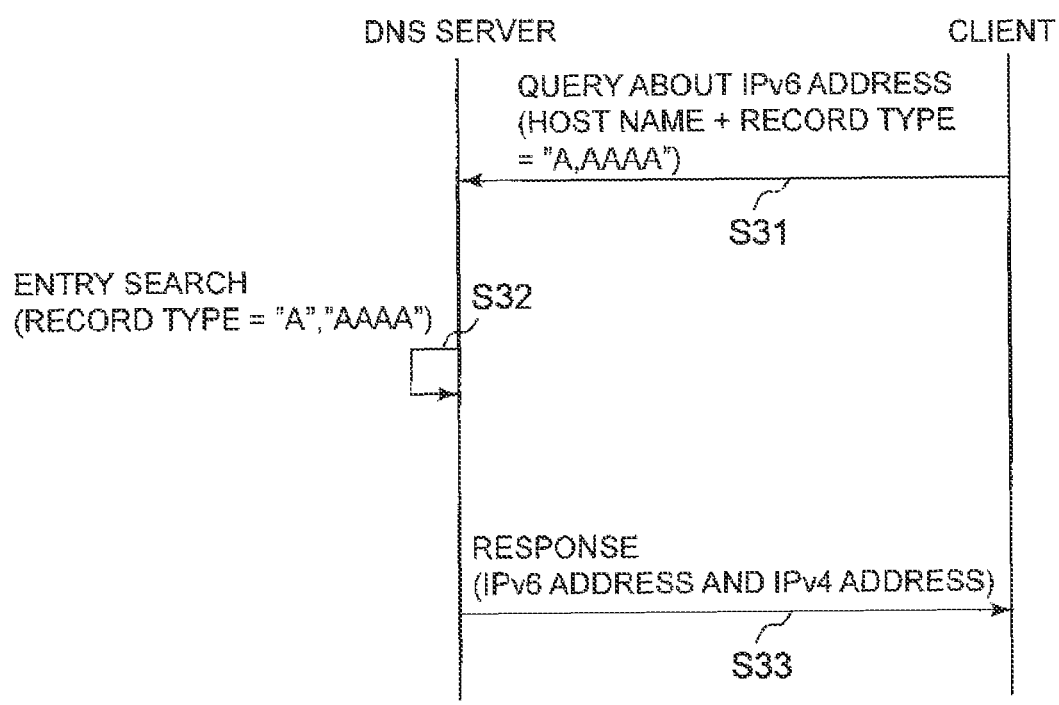
FIG. 12 It depicts a sequence diagram illustrating an example of an operation of performing name resolution.

FIG. 12 is a sequence diagram illustrating an example of an operation of performing name resolution. The address querying means 61 of the client transmits a DNS query packet by which a host name and record types "A" and "AAAA" are designated to the DNS server and queries an address on the host name (step S31). When the DNS server receives the DNS query packet from the client, the entry searching means 71 searches the node information storage means 21, and specifies an entry which corresponds to the host name and has a record types of "A" or "AAAA" (step S32). Then, the search result transmitting means 72 transmits a packet including an address of the specified entry to the client (step S33).

As described above, according to the present exemplary embodiment, the address querying means 61 transmits the host name and a plurality of record types to the name database server 70. Then, the entry searching means 71 searches the node information storage means 21, and specifies an entry that matches the received host name and matches any one of a plurality of record types. Then, the search result transmitting means 72 transmits an address included in the specified entry to the terminal device 60.

Through the above configuration, even in the mixed communication environment of IPv4 and IPv6, name resolution on both IPv4 and IPv6 can be performed by querying a host name once. Further, unlike the second and third exemplary embodiments, since the translating process is not performed by the name database server 70 (server side), the terminal device 60 (client side) needs not perform the translating process for recovering an address.

Figure 13:
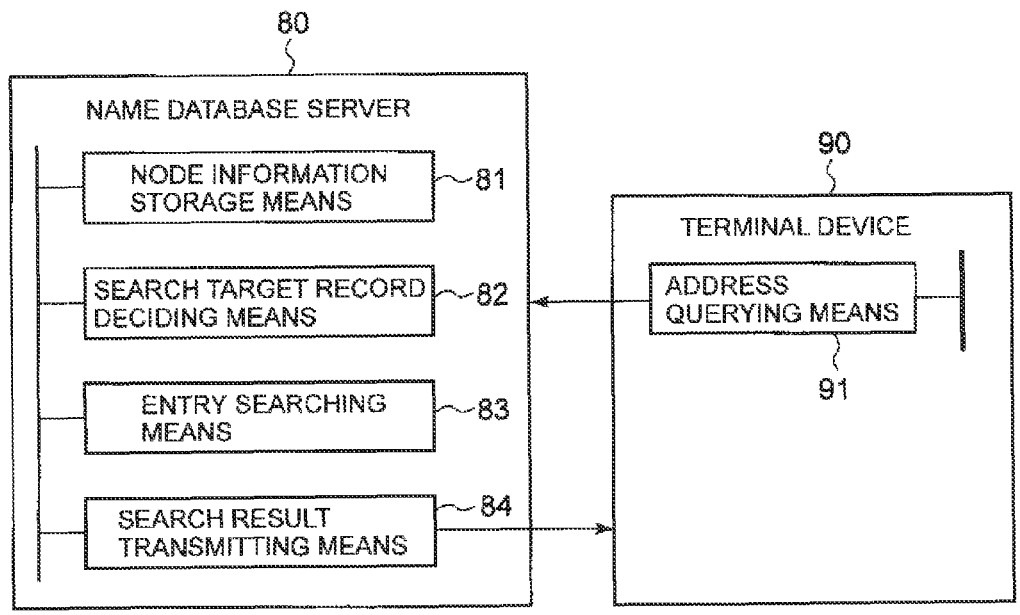
FIG. 13 It depicts a block diagram illustrating an example of a minimum configuration of a name resolution system according to the present invention.
Figure 14:
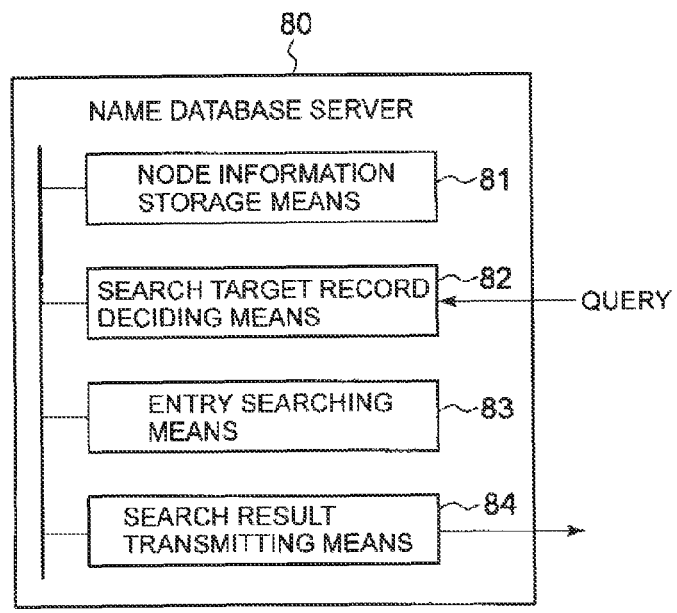
FIG. 14 It depicts a block diagram illustrating an example of a minimum configuration of a name database server according to the present invention.
Figure 15:
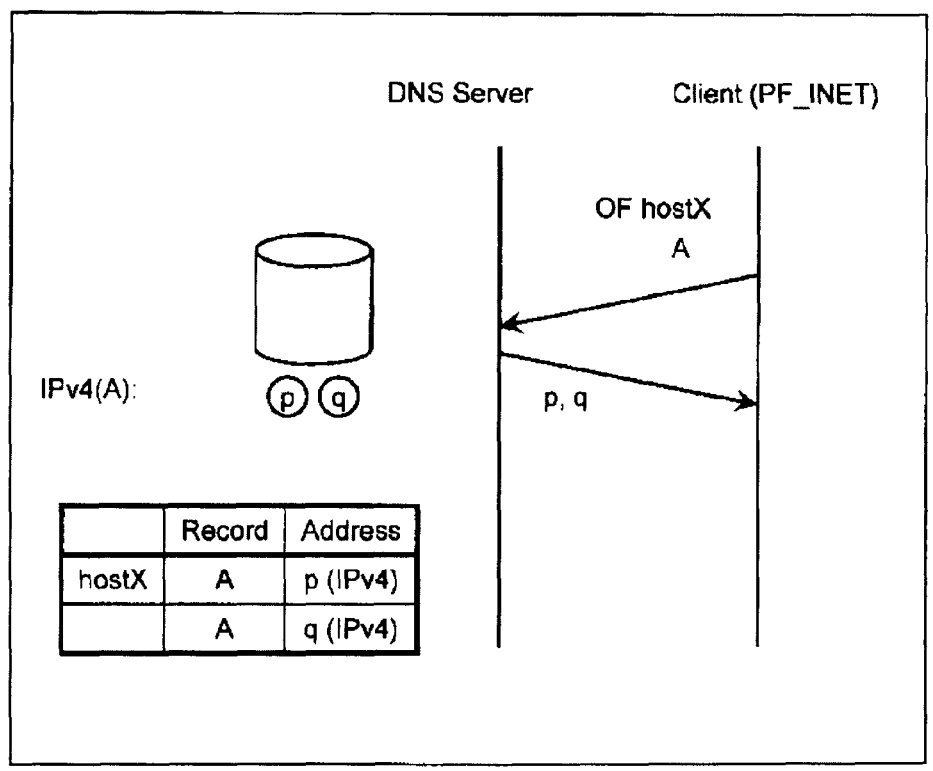
FIG. 15 It depicts an explanatory diagram when name resolution is performed in an IPv4-only communication environment.
Figure 16:
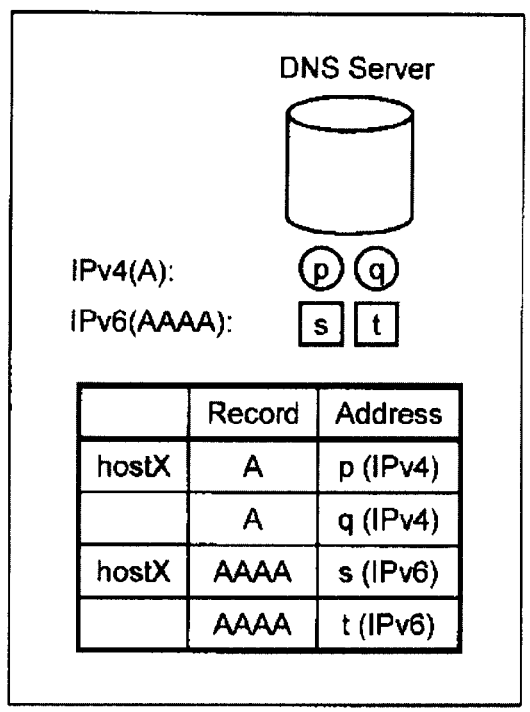
FIG. 16 It depicts an explanatory diagram illustrating an example of information stored in a DNS server.
Figure 17:
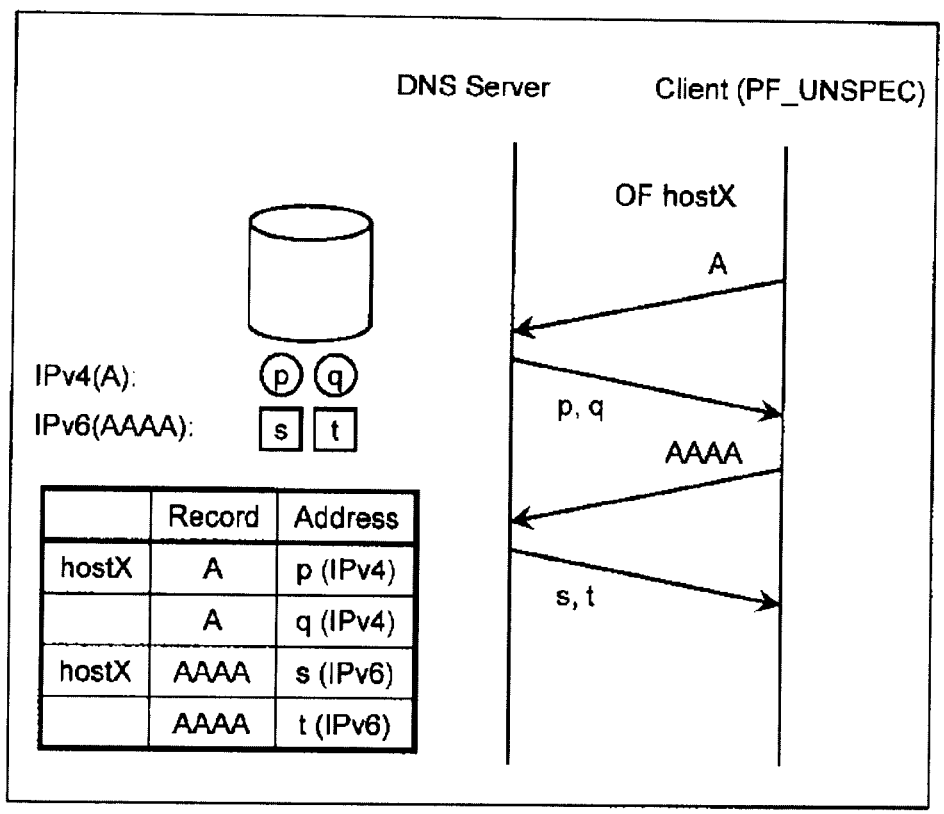
FIG. 17 It depicts an explanatory diagram illustrating an operation of querying a DNS server about an address.
Figure 18:
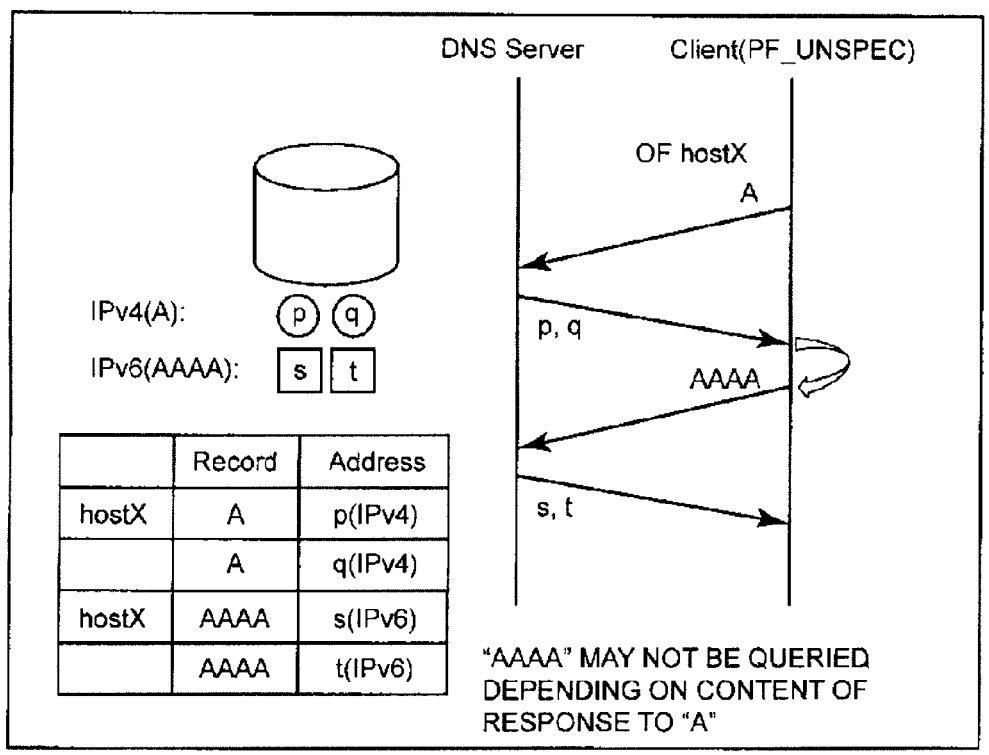
FIG. 18 It depicts an explanatory diagram illustrating an operation of querying a DNS server about an address.
Figure 19:
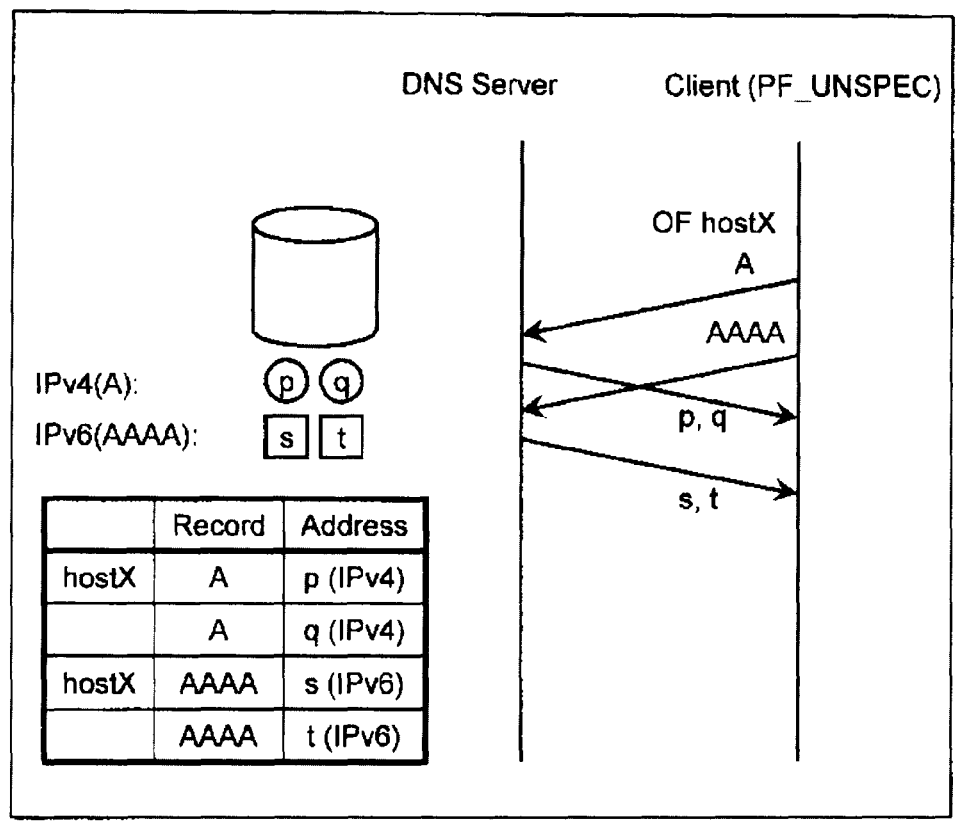
FIG. 19 It depicts an explanatory diagram illustrating an operation of querying a DNS server about an address.
Figure 20:
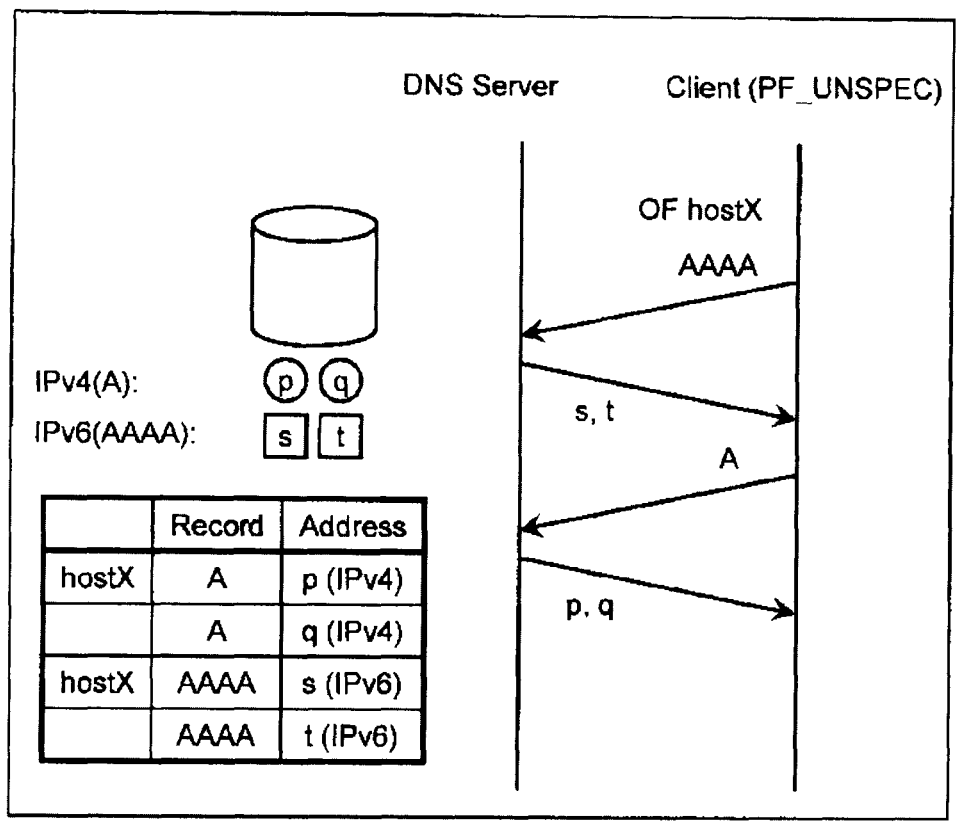
FIG. 20 It depicts an explanatory diagram illustrating an operation of querying a DNS server about an address.
Figure 21:
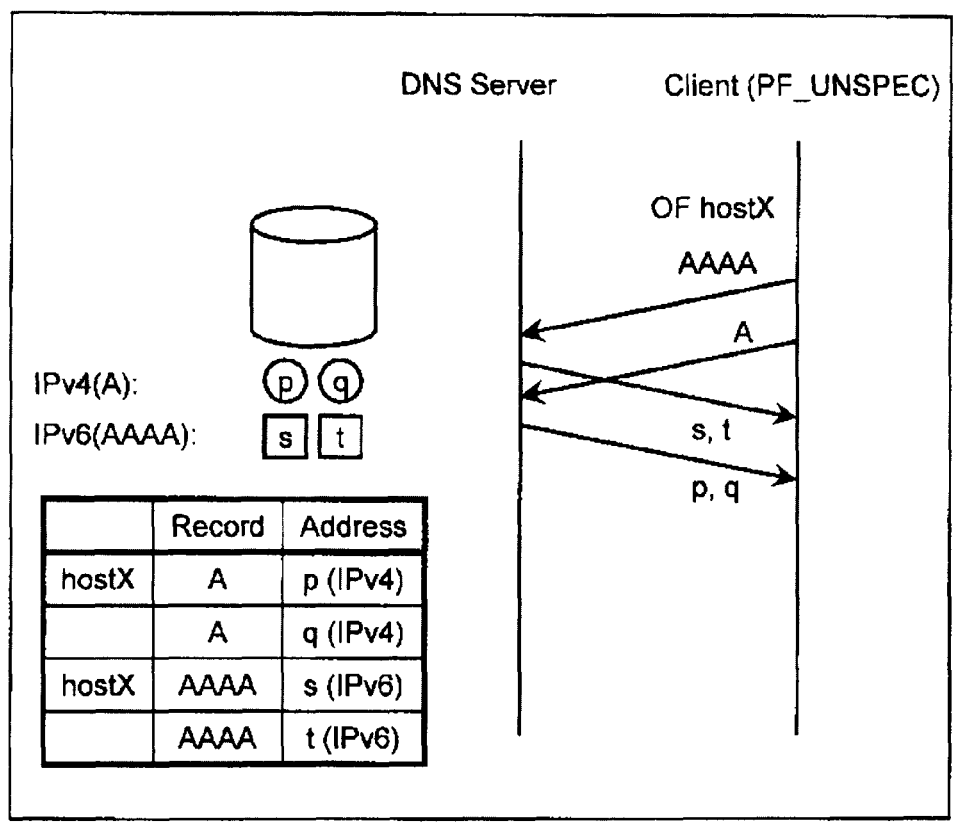
FIG. 21 It depicts an explanatory diagram illustrating an operation of querying a DNS server about an address.

Next, a minimum configuration of the present invention will be described. FIG. 13 is a block diagram illustrating an example of a minimum configuration of a name resolution system according to the present invention. FIG. 14 is a block diagram illustrating an example of a minimum configuration of a name database server according to the present invention.

The name resolution system illustrated in FIG. 13 includes a terminal device 90 (for example, the terminal device 10) that performs a query about node information and a name database server 80 (for example, the name database server 20) that receives the query from the terminal device 90.

The terminal device 90 includes an address querying means 91 (for example, the address querying means 11) that transmits entry specifying information specifying an entry to be stored in the name database server and a virtual record type (for example, "AAAA+A") to the name database server 80, and performs a query about the node information.

The name database server 80 includes a node information storage means 81 (for example, the node information storage means 21) that stores an entry of node information in which at least an address and a record type are associated with a host name, a search target record deciding means 82 (for example, the search target record deciding means 22) that decides a record type (for example, "A" and "AAAA") of an entry of a search target from a received virtual record type (for example, "AAAA+A") based on a search rule which is a rule specifying a record type of a search target according to a virtual record type, an entry searching means 83 (for example, the entry searching means 23) that searches the node information storage means 81 and specifies an entry that corresponds to entry specifying information received from the terminal device 90 and has the record type decided by the search target record deciding means 82, and a search result transmitting means 84 (for example, the search result transmitting means 24) that transmits node information (for example, an IPv4 address and an IPv6 address) included in the entry specified by the entry searching means 83 to the terminal device 90.

The name database server illustrated in FIG. 14 includes a node information storage means 81 (for example, the node information storage means 21), a search target record deciding means 82 (for example, the search target record deciding means 22), an entry searching means 83 (for example, the entry searching means 23), and a search result transmitting means 84 (for example, the search result transmitting means 24). Contents of the node information storage means 81, the search target record deciding means 82, the entry searching means 83, and the search result transmitting means 84 are the same as the contents illustrated in FIG. 13.

Through the above configuration, node information of a plurality of record types can be acquired by a single query.

Further, the search target record deciding means 82 may decide a record type from a virtual record type received from the terminal device 90 based on a search rule that specifies a record type of a search target according to a virtual record type (for example, "AAAA+A") different from a character string representing a record type stored in the node information storage means 81. As described above, as a record type different from a virtual record type stored in the DNS server is used when a query is performed, influence on the existing structure can be suppressed.

Further, when a virtual record type and a host name are received, the search target record deciding means 82 may decide a record type (for example, "AAAA") representing an IPv6 address and a record type (for example, "A") representing an IPv4 address as a record type of an entry of a search target, and the entry searching means 83 may search the node information storage means 81 and specify an entry that corresponds to the host name received from the terminal device 90 and has a record type representing an IPv6 address and a record type representing an IPv4 address.

The present invention has been described with reference to the exemplary embodiments and examples, but the present invention is not limited to the exemplary embodiment and examples. Further, various changes that person having ordinary skill in the art can understand can be made on the configuration or details of the present invention within the scope of the present invention.

This application claims priority to and the benefit of Japanese Patent Application No. 2010-233412 filed on Oct. 18, 2010, the disclosure of which is incorporated by reference herein.

INDUSTRIAL APPLICABILITY

The present invention is appropriately applied to a name database server used to perform name resolution in a communication environment in which a plurality of record types are present.

REFERENCE SIGNS LIST 10, 30, 60 Terminal device
11, 31, 61 Address querying means
20, 40, 50, 70 Name database server
21 Node information storage means
22 Search target record deciding means
24, 43, 54, 72 Search result transmitting means
32 Translation address retranslating means
23, 41, 53, 71 Entry searching means
42, 52 Address translating means
51 Translation address storage means

The invention claimed is:

1. A name database server, comprising:
a processor configured to execute:
a node information storage unit that stores an entry of node information in which at least an address and a record type are associated with a host name;
a search target record deciding unit that decides a record type of an entry of a search target from a virtual record type received from a terminal device that transmits a virtual record type and entry specifying information that is information specifying an entry and queries node information corresponding to the entry specifying information based on a search rule that is a rule specifying a record type of a search target according to a virtual record type;
an entry searching unit that searches the node information storage unit, and specifies an entry that corresponds to the entry specifying information received from the terminal device and has the record type decided by the search target record deciding unit; and
a search result transmitting unit that transmits node information included in the entry specified by the entry searching unit to the terminal device.

2. The name database server according to claim 1,
wherein the search target record deciding unit decides a record type from a character string received from the terminal device based on a search rule specifying a record type of a search target according to a virtual record type different from a record type stored in the node information storage unit.

3. The name database server according to claim 1,
wherein when a virtual record type and a host name are received, the search target record deciding unit decides a record type representing an IPv6 address and a record type representing an IPv4 address as a record type of an entry of a search target, and
the entry searching unit searches the node information storage unit, and specifies an entry that corresponds to the host name received from the terminal device and has a record type representing an IPv6 address and a record type representing an IPv4 address.

4. A name resolution system, comprising:
a terminal device that performs a query about node information; and
a name database server that receives a query from the terminal device,
wherein the terminal device includes an address querying unit that transmits entry specifying information specifying an entry stored in the name database server and a virtual record type to the name database server, and performs a query about the node information, and
the name database server includes
a node information storage unit that stores an entry of node information in which at least an address and a record type are associated with a host name,
a search target record deciding unit that decides a record type of an entry of a search target from a received virtual record type based on a search rule that is a rule specifying a record type of a search target according to a virtual record type,
an entry searching unit that searches the node information storage unit, and specifies an entry that corresponds to the entry specifying information received from the terminal device and has the record type decided by the search target record deciding unit, and a search result transmitting unit that transmits node information included in the entry specified by the entry searching unit to the terminal device.

5. The name resolution system according to claim 4, wherein the address querying unit of the terminal device transmits a host name of a target performing name resolution and a virtual record type different from a record type stored in the node information storage unit to the name database server, and queries an address corresponding to the host name, and the search target record deciding unit of the name database server decides a record type from a virtual record type received from the terminal device based on a search rule specifying a record type of a search target according to the character string.

6. The name resolution system according to claim 4, wherein when a virtual record type and a node name are received, the search target record deciding unit decides a record type representing an IPv6 address and a record type representing an IPv4 address as a record type of an entry of a search target, and the entry searching unit searches the node information storage unit, and specifies an entry that corresponds to the host name received from the terminal device and has a record type representing an IPv6 address and a record type representing an IPv4 address.

7. An entry search method, comprising:
deciding a record type of an entry of a search target from a virtual record type received from a terminal device that transmits entry specifying information that is information specifying an entry of node information in which at least an address and a record type are associated with a host name and a virtual record type and queries node information corresponding to the entry specifying information based on a search rule that is a rule specifying a record type of a search target according to a virtual record type;
searching a node information storage unit storing the entry, and specifying an entry that corresponds to the entry specifying information received from the terminal device and has the decided record type; and
transmitting node information included in the specified entry to the terminal device.

8. The entry search method according to claim 7, wherein when a record type is decided, a record type is decided from a character string received from the terminal device based on a search rule specifying a record type of a search target according to a virtual record type different from a character string representing a record type stored in the node information storage unit.

9. A name resolution method, comprising:
transmitting, by a terminal device that performs a query about node information, entry specifying information specifying an entry stored in a name database server that transmits node information in response to the query and a virtual record type to the name database server and querying the node information;

by the name database server,
deciding a record type of an entry of a search target from a received virtual record type based on a search rule that is a rule specifying a record type of a search target according to a virtual record type;
searching a node information storage unit that stores an entry of node information in which at least an address and a record type are associated with a host name, and specifying an entry that corresponds to the entry specifying information received from the terminal device and has the decided record type; and
transmitting node information included in the specified entry to the terminal device.

10. The name resolution method according to claim 9, wherein the terminal device transmits a host name of a target performing name resolution and a virtual record type different from a character string representing a record type stored in the node information storage unit to the name database server, and queries an address corresponding to the host name, and
the name database server decides a record type from a virtual record type received from the terminal device based on a search rule specifying a record type of a search target according to the character string.

11. A non-transitory computer readable information recording medium storing an entry search program applied to a computer including a node information storage unit that stores an entry of node information in which at least an address and a record type are associated with a host name, when executed by a processor, the program performs a method for:
deciding a record type of an entry of a search target from a virtual record type received from a terminal device that transmits a virtual record type and entry specifying information that is information specifying an entry and queries node information corresponding to the entry specifying information based on a search rule that is a rule specifying a record type of a search target according to a virtual record type;
searching the node information storage unit, and specifying an entry that corresponds to the entry specifying information received from the terminal device and has the decided record type; and
transmitting node information included in the specified entry to the terminal device.

12. The non-transitory computer readable information recording medium according to claim 11, deciding a record type from a character string received from the terminal device based on a search rule specifying a record type of a search target according to a virtual record type different from a record type stored in the node information storage unit.

13. The name database server according to claim 1, wherein the virtual record type is a record type which is not stored in a node information storage unit.

\* \* \* \* \*